(12) United States Patent
Hankins

(10) Patent No.: US 10,242,331 B2
(45) Date of Patent: Mar. 26, 2019

(54) SUPPLEMENTAL SYSTEM FOR BUSINESS INTELLIGENCE SYSTEMS TO PROVIDE VISUAL IDENTIFICATION OF MEANINGFUL DIFFERENCES

(71) Applicant: Motio, Inc., Plano, TX (US)

(72) Inventor: Lance W. Hankins, Allen, TX (US)

(73) Assignee: Motio, Inc., Dallas, TX (US)

( * ) Notice: Subject to any disclaimer, the term of this patent is extended or adjusted under 35 U.S.C. 154(b) by 0 days.

(21) Appl. No.: 15/662,898

(22) Filed: Jul. 28, 2017

(65) Prior Publication Data

US 2017/0330115 A1 Nov. 16, 2017

Related U.S. Application Data

(63) Continuation-in-part of application No. 15/076,437, filed on Mar. 21, 2016, now Pat. No. 9,785,907.

(51) Int. Cl.

| | |
|---|---|
| *G06F 17/00* | (2006.01) |
| *G06Q 10/06* | (2012.01) |
| *G06F 8/71* | (2018.01) |
| *G06F 11/36* | (2006.01) |
| *G06F 17/22* | (2006.01) |
| *G06Q 10/10* | (2012.01) |

(52) U.S. Cl.
CPC .............. *G06Q 10/067* (2013.01); *G06F 8/71* (2013.01); *G06F 11/368* (2013.01); *G06F 17/2288* (2013.01); *G06Q 10/0637* (2013.01); *G06Q 10/10* (2013.01); *Y10S 707/944* (2013.01)

(58) Field of Classification Search
CPC ...... G06F 8/71; G06F 11/368; G06F 17/2288; G06Q 10/10; G06Q 10/067; G06Q 10/0637

USPC .......................................... 707/638, 695, 944
See application file for complete search history.

(56) References Cited

U.S. PATENT DOCUMENTS

| | | | |
|---|---|---|---|
| 6,526,574 B1 | 2/2003 | Jones | |
| 6,539,396 B1* | 3/2003 | Bowman-Amuah | ........................ G06F 17/30607 707/769 |
| 6,542,841 B1* | 4/2003 | Snyder | ............... H04B 10/0795 372/26 |

(Continued)

FOREIGN PATENT DOCUMENTS

EP 1205842 5/2002

OTHER PUBLICATIONS

Metzger J. and Jose Pimentel, "Getting the Most Out of Report Studio," Cognos Forum 2007, pp. 1-25, 2007.

(Continued)

*Primary Examiner* — Phong H Nguyen
(74) *Attorney, Agent, or Firm* — Ferguson Braswell Fraser Kubasta PC; Elizabeth Philip Dahm; Kelly J. Kubasta

(57) ABSTRACT

In various implementations, a supplemental system may be provided. The supplemental system may be coupled to business intelligence environment(s) to facilitate visual identification of meaningful differences. In some implementations, expressions to exclude may be identified and specifications associated with BI Artifacts may be instrumented based on the expressions to exclude. Enhanced Business Intelligence Artifact Outputs may be generated to visually identify differences between BI Artifact Outputs that are not associated with expressions to exclude.

20 Claims, 20 Drawing Sheets

(56) References Cited

U.S. PATENT DOCUMENTS

| | | | | |
|---|---|---|---|---|
| 7,505,991 | B2* | 3/2009 | Fifield | G06Q 10/00 707/999.103 |
| 7,730,057 | B2* | 6/2010 | Bell | G06F 9/5077 703/21 |
| 7,930,149 | B2* | 4/2011 | Haag | G06Q 10/087 700/97 |
| 7,945,589 | B1* | 5/2011 | Weiss | G06F 8/71 707/795 |
| 2002/0198868 | A1* | 12/2002 | Kinzhalin | G06F 11/3672 714/E11.208 |
| 2003/0050886 | A1* | 3/2003 | Cohen | G06Q 10/06 705/37 |
| 2003/0204835 | A1* | 10/2003 | Budhiraja | G06F 8/656 717/120 |
| 2004/0168115 | A1* | 8/2004 | Bauernschmidt | G06F 17/2241 715/238 |
| 2005/0071390 | A1* | 3/2005 | Midgley | G06F 11/1451 714/E11.13 |
| 2005/0229159 | A1* | 10/2005 | Haba | G06F 11/3672 717/122 |
| 2006/0075114 | A1* | 4/2006 | Panasyuk | H04L 67/28 709/227 |
| 2006/0235732 | A1* | 10/2006 | Miller | G06Q 10/06 705/7.23 |
| 2006/0277155 | A1* | 12/2006 | Bell | G06F 9/5077 707/E17.032 |
| 2007/0033212 | A1* | 2/2007 | Fifield | G06Q 10/00 707/999.102 |
| 2007/0038683 | A1* | 2/2007 | Dixon | G06Q 10/06 707/E17.005 |
| 2007/0038977 | A1* | 2/2007 | Savage | G06F 8/20 717/106 |
| 2007/0061154 | A1* | 3/2007 | Markvoort | G06F 17/50 705/51 |
| 2007/0067254 | A1* | 3/2007 | Chen | G06Q 10/10 707/999.001 |
| 2007/0106982 | A1* | 5/2007 | Dalal | G06F 8/71 717/128 |
| 2007/0192113 | A1* | 8/2007 | Sadowski | G06Q 10/06 705/1.1 |
| 2007/0294321 | A1* | 12/2007 | Midgley | G06F 11/1451 |
| 2008/0288451 | A1* | 11/2008 | Jiang | G06F 17/30415 707/999.003 |
| 2010/0306782 | A1* | 12/2010 | Engrand | G06Q 10/10 719/312 |
| 2011/0066594 | A1 | 3/2011 | Srivastava et al. | |
| 2013/0097585 | A1* | 4/2013 | Jentsch | G06F 8/71 717/122 |
| 2013/0262419 | A1* | 10/2013 | Kilian | G06F 17/2705 707/695 |
| 2014/0365519 | A1* | 12/2014 | Middelfart | G06F 17/30477 707/769 |

OTHER PUBLICATIONS

Metzger J. and Jose Pimentel, "Getting the Most Out of Report Studio," Cognos Forum 2007, pp. 1-43, 2007.

Sleigh, Cynthia, "Modifying a Report Specification Using the Cognos(R) ReportNetTM SDK", IBM Cognos Supportlink, vol. 14, No. 2, pp. 57-60, 2004.

Topic Thread for "Clearing optional prompts in Report Studio", available at www.cognoise.com, pp. 1-4, thread date May 2007.

Miller, Angus, "Howto Include Custom Javascript in Cognos 8 by Default." available at http://angusmiller.co.za/2007/06/03/howto-include-custom-javascript-in-cognos-8-windows/, Jun. 3, 2007.

Cognos(R) 8 Business Intelligence Upgrade Manager User Guide, IBM, 2007.

Administration and Security Guide, IBM Congos Administration, IBM, ver. 10.1.0, 2010.

McDonald, Greg et al., "IBM Cognos Proven Practices: Installing and Configuring IBM Cognos Lifecycle Manager for Optimum Results", developerWorks, IBM, Jul. 15, 2011.

"ADF Report Service," Motio, Jun. 2008.

"adf-2.8.javadoc-spec-mods," Motio, Sep. 2010.

"Architectural Overview of MotioADF Overview for Report Authors," Motio, pp. 1-14, 2008.

"Getting Started with Focus Application Development Framework," Focus Technologies, Jan. 2008.

"Architectural Overview of MotioADF for Developers," Motio, pp. 1-22, 2008.

"Details on Typical MotioADF Based Custom Wed Application," Motio, Sep. 2009.

"ADF Feature Overview," Motio, Sep. 2009.

"Motio CI(TM) User Guide, version 1.4," Motio, 2009.

"Motio CI(TM) User Guide, version 2.0," Motio, 2010.

Manber, Udi, "Finding Similar Files in a Large File System," InUsenix, Winter, vol. 94, pp. 1-10, Jan. 1994.

Rafael C. Gonzalez et al., "Digital Image Processing," Third Edition, Pearson Prentice Hail, Pearson Education, Inc., 2008 (122 pages).

Dean Browne et al., "IBM Cognos Business Intelligence V10.1 Handbook," International Business Machines Corporation, Oct. 2010 (572 pages).

"IBM Cognos Lifecycle Manager, Version 10.1.0, User Guide," IBM Corp., 2007 (54 pages).

Anthony Thyssen, "ImageMagick v6 Examples—Image Comparing," http://www.imagemagick.org/Usage/compare/, Jun. 7, 2005 (29 pages).

"Comparison," i-net software, i-net PDFC, 1996 (7 pages).

"Comparison Web API," i-net software, i-net PDFC, 1996 (4 pages).

"Overview," i-net software, i-net PDFC, 1996, (10 pages).

"DiffPDF," Qtrac Ltd., 2006 (9 pages).

"diffpdfc," Qtrac Ltd., 2006 (9 pages).

P. Spagnolo et al., "Moving object segmentation by background subtraction and temporal analysis," Elsevier, Image and Vision Computing 24, Jan. 3, 2006 (13 pages).

D. M. Bramich, "A new algorithm for difference image analysis," Monthly Notices of the Royal Astronomical Society: Letters, 386: L77-L81, Feb. 2008 (5 pages).

Raman Maini et al., "Study and Comparison of Various Image Edge Detection Techniques," International Journal of Image Processing, vol. 3, Issue 1, Feb. 2009 (12 pages).

\* cited by examiner

| FIG. 2A-1 | FIG. 2A-2 | FIG. 2A-3 |

| | 👁 ≡ ⋯ 👤 Lance Hankins | ? |
|---|---|---|
| | ⬚ ⌄ Packed bubble | 📌 |
| | CONDITIONAL | |
| | Render variable | |
| | DATA | |
| 203 ↘ | Data format | |
| | GENERAL | |
| | Type | rave-library-bubble... |
| | MISCELLANEOUS | |
| | Name | Packed bubble1 |
| | Alternate text | None |
| | COMMON | |
| | Background color | ☐ Transparent |
| | Elements background color | ☐ Transparent |
| | Color palette | |
| | Padding | padding-top:10; pad... |
| | Width | 500 |
| | Height | 500 |
| | BUBBLE | |
| | Bubble label | Yes |
| | Item label font | |
| | Show pack bubbles with negative values | No |
| | Bubble border color | ▨ #CCCCCC |
| | Bubble border width | 0px |
| | LEGEND | |
| | Show legend | No |
| | Legend position | right |
| | Space between legend and chart | 10 |
| | Align legend to chart | No |
| | Title | |
| | Title font | |
| | Entry font | |

FROM FIG. 2A-2

| FIG. 2B-1 |
| FIG. 2B-2 |

FIG. 2B-1

201 → Monthly Snapshot

Monthly Snapshot     For Period: <dateRangeDescr>

Forecast

| <Product line> | <Expected volume> | <Forecast revenue> |
|---|---|---|
| Product line> | Expected volume> | Forecast revenue> |
| <Product line> | <Expected volume> | <Forecast revenue> |
| <Product line> | <Expected volume> | <Forecast revenue> |
| Overall - Summary | Summary(Expected volume>) | Summary(Forecast revenue>) |

Returns

| <Product line> | <Return quantity> |
|---|---|
| Product line> | Return quantity> |
| <Product line> | <Return quantity> |
| Overall - Summary | Summary(Return quantity) |

↙ 210

☐ Lance Hankins

▽ List

| Grouping & sorting | (Defined) |
|---|---|
| Query | ReturnsQuery |
| Rows per page | |
| Master detail relationships | |
| Suppression | |
| Properties | |
| Share result set | No |
| GENERAL | |
| Contents height | Minimal |
| Column titles | At start of list |
| Scrollable area height | |
| Pagination | (Defined) |
| Render page when empty | Yes |
| BOX | |

TO FIG. 2B-2

| FIG. 2D-1 |
| FIG. 2D-2 |

FIG. 4A

| FIG. 4A-1 | FIG. 4A-2 |

FIG. 4A-1

[Previous] [Next] Page: 1/1  ☐ Highlight Diffs on Originals   ┌─ Comparison Format ─┐
                                                               ⦿ Image Overlay  ○ Text    402  403

Monthly Snapshot (Cognos 11.0.6) - Download Enhanced LHS PDF

401 ↓

Monthly Snapshot
Forecast                                  410

| Product line | Expected volume | Forecast revenue |
|---|---|---|
| Camping Equipment | 676,615 | 41,637,792 |
| Golf Equipment | 104,290 | 17,900,399 |
| Mountaineering Equipment | 309,865 | 13,980,565 |
| Outdoor Protection | 128,085 | 859,410 |
| Personal Accessories | 930,455 | 56,409,666 |
| Overall - Summary | 2,149,310 | 130,787,833 |

Sales Actuals

| Product line | Revenue | Gross profit |
|---|---|---|
| Camping Equipment | 46,455,730 | 17,407,916 |
| Golf Equipment | 20,105,140 | 10,278,390 |
| Mountaineering Equipment | 15,880,561 | 6,282,838 |
| Outdoor Protection | 932,109 | 592,011 |
| Personal Accessories | 58,501,702 | 24,451,462 |
| Overall - Summary | 141,875,242.63 | 59,012,616.86 |

Sales Actuals - Same Period Last Year

| Product line | Revenue | Gross profit |
|---|---|---|
| Camping Equipment | 34,596,253 | 12,244,023 |
| Golf Equipment | 12,732,708 | 6,042,043 |
| Mountaineering Equipment | 8,487,745 | 3,337,502 |
| Outdoor Protection | 1,957,392 | 1,220,851 |
| Personal Accessories | 42,292,709 | 17,196,850 |
| Overall - Summary | 100,066,807 | 40,041,268 |

For Period: 6/1/2012 to 6/30/2012
Returns

| Product line | Return quantity |
|---|---|
| Camping Equipment | 10,475 |
| Golf Equipment | 2,613 |
| Mountaineering Equipment | 7,201 |
| Outdoor Protection | 1,167 |
| Personal Accessories | 8,660 |
| Overall - Summary | 30,116 |

Profit Contributors 420

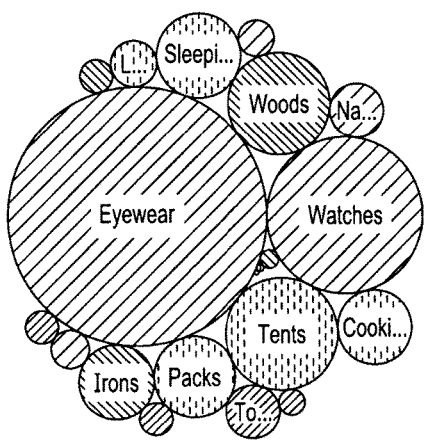

Monthly Snapshot (Cognos 11.0.6) - Download Enhanced RHS PDF

Monthly Snapshot - v2

Forecast

| Product line | Expected volume | Forecast revenue |
|---|---|---|
| Camping Equipment | 690147 | 42,470,548 |
| Golf Equipment | 106,376 | 18,258,407 |
| Mountaineering Equipment | 316,062 | 14,260,176 |
| Outdoor Protection | 130,647 | 876,598 |
| Personal Accessories | 949,064 | 57,537,860 |
| Overall - Summary | 2,192,296 | 133,403,590 |

Sales Actuals

| Product line | Revenue | Gross profit |
|---|---|---|
| Camping Equipment | 47,384,845 | 17,581,996 |
| Golf Equipment | 20,507,243 | 10,381,174 |
| Mountaineering Equipment | 16,198,173 | 6,345,666 |
| Outdoor Protection | 950,751 | 597,931 |
| Personal Accessories | 59,671,736 | 24,695,977 |
| Overall - Summary | 144,712,747.48 | 59,602,743.03 |

Sales Actuals - Same Period Last Year

| Product line | Revenue | Gross profit |
|---|---|---|
| Camping Equipment | 34,596,253 | 12,244,023 |
| Golf Equipment | 12,732,708 | 6,042,043 |
| Mountaineering Equipment | 8,487,745 | 3,337,502 |
| Outdoor Protection | 1,957,392 | 1,220,851 |
| Personal Accessories | 42,292,709 | 17,196,850 |
| Overall - Summary | 100,066,807 | 40,041,268 |

For Period: 6/1/2012 to 6/30/2012

Returns

| Product line | Return quantity |
|---|---|
| Camping Equipment | 11,522 |
| Golf Equipment | 2,874 |
| Mountaineering Equipment | 7,921 |
| Outdoor Protection | 1,284 |
| Personal Accessories | 9,526 |
| Overall - Summary | 33,128 |

Profit Contributors   421

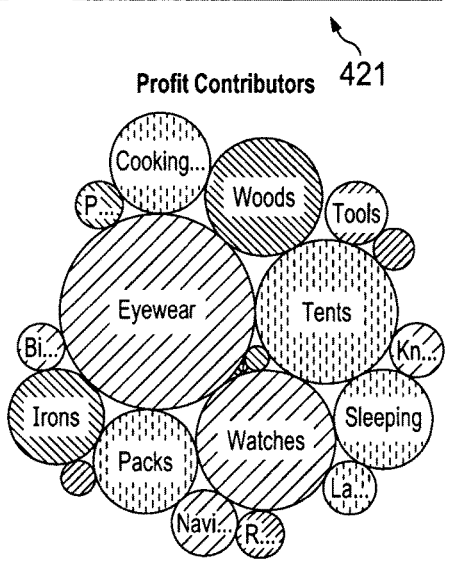

FROM FIG. 4A-1

FIG. 4B

| FIG. 4B-1 | FIG. 4B-2 |

[Previous] [Next] Page: 1/1 ☑ Highlight Diffs on Originals

Comparison Format — ⦿ Image Overlay ○ Text    402  403

Monthly Snapshot (Cognos 11.0.6) - Download Enhanced LHS PDF

Monthly Snapshot ~430

Forecast

| Product line | Expected volume | Forecast revenue |
|---|---|---|
| Camping Equipment | 676,615 | 41,637,792 |
| Golf Equipment | 104,290 | 17,900,399 |
| Mountaineering Equipment | 309,865 | 13,980,565 |
| Outdoor Protection | 128,085 | 859,410 |
| Personal Accessories | 930,455 | 56,409,666 |
| Overall - Summary | 2,149,310 | 130,787,833 |

For Period: 6/1/2012 to 6/30/2012

Returns

| Product line | Return quantity |
|---|---|
| Camping Equipment | 10,475 |
| Golf Equipment | 2,613 |
| Mountaineering Equipment | 7,201 |
| Outdoor Protection | 1,167 |
| Personal Accessories | 8,660 |
| Overall - Summary | 30,116 |

Sales Actuals

| Product line | Revenue | Gross profit |
|---|---|---|
| Camping Equipment | 46,455,730 | 17,407,916 |
| Golf Equipment | 20,105,140 | 10,278,390 |
| Mountaineering Equipment | 15,880,561 | 6,282,838 |
| Outdoor Protection | 932,109 | 592,011 |
| Personal Accessories | 58,501,702 | 24,451,462 |
| Overall - Summary | 141,875,242.63 | 59,012,616.86 |

Profit Contributors 420

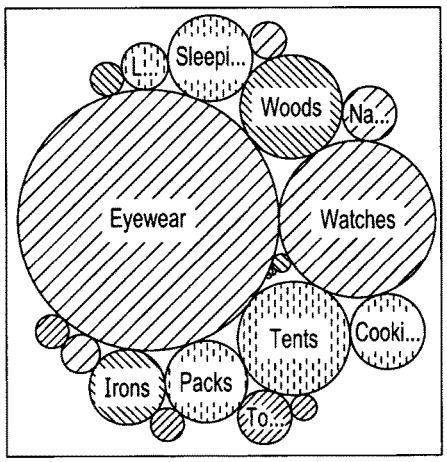

Sales Actuals - Same Period Last Year    430

| Product line | Revenue | Gross profit |
|---|---|---|
| Camping Equipment | 34,596,253 | 12,244,023 |
| Golf Equipment | 12,732,708 | 6,042,043 |
| Mountaineering Equipment | 8,487,745 | 3,337,502 |
| Outdoor Protection | 1,957,392 | 1,220,851 |
| Personal Accessories | 42,292,709 | 17,196,850 |
| Overall - Summary | 100,066,807 | 40,041,268 |

Monthly Snapshot (Cognos 11.0.6) - Download Enhanced RHS PDF

Monthly Snapshot -v2  ← 430
Forecast

| Product line | Expected volume | Forecast revenue |
|---|---|---|
| Camping Equipment | 690,147 | 42,470,548 |
| Golf Equipment | 106,376 | 18,258,407 |
| Mountaineering Equipment | 316,062 | 14,260,176 |
| Outdoor Protection | 130,647 | 876,598 |
| Personal Accessories | 949,064 | 57,537,860 |
| Overall - Summary | 2,192,296 | 133,403,590 |

Sales Actuals

| Product line | Revenue | Gross profit |
|---|---|---|
| Camping Equipment | 47,384,845 | 17,581,996 |
| Golf Equipment | 20,507,243 | 10,381,174 |
| Mountaineering Equipment | 16,198,173 | 6,345,666 |
| Outdoor Protection | 950,751 | 597,931 |
| Personal Accessories | 59,671,736 | 24,695,977 |
| Overall - Summary | 144,712,747.48 | 59,602,743.03 |

Sales Actuals - Same Period Last Year

| Product line | Revenue | Gross profit |
|---|---|---|
| Camping Equipment | 34,596,253 | 12,244,023 |
| Golf Equipment | 12,732,708 | 6,042,043 |
| Mountaineering Equipment | 8,487,745 | 3,337,502 |
| Outdoor Protection | 1,957,392 | 1,220,851 |
| Personal Accessories | 42,292,709 | 17,196,850 |
| Overall - Summary | 100,066,807 | 40,041,268 |

For Period: 6/1/2012 to 6/30/2012 — 404, 405

Returns

| Product line | Return quantity |
|---|---|
| Camping Equipment | 11,522 |
| Golf Equipment | 2,874 |
| Mountaineering Equipment | 7,921 |
| Outdoor Protection | 1,284 |
| Personal Accessories | 9,526 |
| Overall - Summary | 33,128 |

Profit Contributors 421

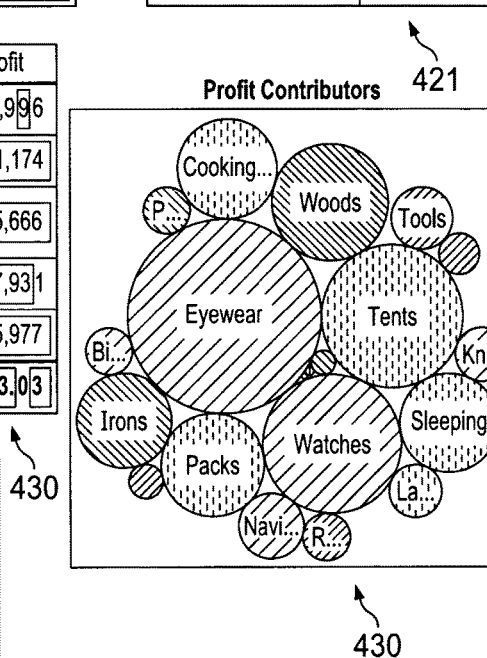

First BI Artifact Output.pdf

File  Edit  View  Go  Bookmarks  Help

Monthly Snapshot  For Period: 6/1/2012 to 6/30/2012

Forecast

| Product line | Expected volume | Forecast revenue |
|---|---|---|
| Camping Equipment | 676,615 | 41,637,792 |
| Golf Equipment | 104,290 | 17,900,399 |
| Mountaineering Equipment | 309,865 | 13,980,565 |
| Outdoor Protection | 128,085 | 859,410 |
| Personal Accessories | 930,455 | 56,409,666 |
| Overall - Summary | 2,149,310 | 130,787,833 |

Returns

| Product line | Return quantity |
|---|---|
| Camping Equipment | 10,475 |
| Golf Equipment | 2,613 |
| Mountaineering Equipment | 7,201 |
| Outdoor Protection | 1,167 |
| Personal Accessories | 8,660 |
| Overall - Summary | 30,116 |

Sales Actuals

| Product line | Revenue | Gross profit |
|---|---|---|
| Camping Equipment | 46,455,730 | 17,407,916 |
| Golf Equipment | 20,105,140 | 10,278,390 |
| Mountaineering Equipment | 15,880,561 | 6,282,838 |
| Outdoor Protection | 932,109 | 592,011 |
| Personal Accessories | 58,501,702 | 24,451,462 |
| Overall - Summary | 141,875,242.63 | 59,012,616.86 |

Profit Contributors 420

Sales Actuals - Same Period Last Year

| Product line | Revenue | Gross profit |
|---|---|---|
| Camping Equipment | 34,596,253 | 12,244,023 |
| Golf Equipment | 12,732,708 | 6,042,043 |
| Mountaineering Equipment | 8,487,745 | 3,337,502 |
| Outdoor Protection | 1,957,392 | 1,220,851 |
| Personal Accessories | 42,292,709 | 17,196,850 |
| Overall - Summary | 100,066,807 | 40,041,268 |

FIG. 5B

| | Second BI Artifact Output.pdf | | |
|---|---|---|---|

Monthly Snapshot - v2  For Period: 6/1/2012 to 6/30/2012

Forecast

| Product line | Expected volume | Forecast revenue |
|---|---|---|
| Camping Equipment | 690,147 | 42,470,548 |
| Golf Equipment | 106,376 | 18,258,407 |
| Mountaineering Equipment | 316,062 | 14,260,176 |
| Outdoor Protection | 130,647 | 876,598 |
| Personal Accessories | 949,064 | 57,537,860 |
| Overall - Summary | 2,192,296 | 133,403,590 |

Returns

| Product line | Return quantity |
|---|---|
| Camping Equipment | 11,522 |
| Golf Equipment | 2,874 |
| Mountaineering Equipment | 7,921 |
| Outdoor Protection | 1,284 |
| Personal Accessories | 9,526 |
| Overall - Summary | 33,128 |

Sales Actuals

| Product line | Revenue | Gross profit |
|---|---|---|
| Camping Equipment | 47,384,845 | 17,581,996 |
| Golf Equipment | 20,507,243 | 10,381,174 |
| Mountaineering Equipment | 16,198,173 | 6,345,666 |
| Outdoor Protection | 950,751 | 597,931 |
| Personal Accessories | 59,671,736 | 24,695,977 |
| Overall - Summary | 144,712,747.48 | 59,602,743.03 |

Profit Contributors 421

(bubble chart with labels: Cooking..., P., Woods, Tools, Bi..., Eyewear, Tents, Kn..., Irons, Packs, Watches, Sleeping, Navi..., R., La...)

Sales Actuals - Same Period Last Year

| Product line | Revenue | Gross profit |
|---|---|---|
| Camping Equipment | 34,596,253 | 12,244,023 |
| Golf Equipment | 12,732,708 | 6,042,043 |
| Mountaineering Equipment | 8,487,745 | 3,337,502 |
| Outdoor Protection | 1,957,392 | 1,220,851 |
| Personal Accessories | 42,292,709 | 17,196,850 |
| Overall - Summary | 100,066,807 | 40,041,268 |

FIG. 7A

*Motio PDF Compare: Differences [1 - 34]* ← 601

Monthly Snapshot ☐ ← 430  
Forecast

For Period: 6/1/2012 to 6/30/2012  
Returns

| Product line | Expected volume | Forecast revenue |
|---|---|---|
| Camping Equipment | 6\|76,615 | 4\|1,637,792 |
| Golf Equipment | 10\|4,290 | 1\|7,900,399 |
| Mountaineering Equipment | 3\|09,865 | 1\|3,98\|0,\|565 |
| Outdoor Protection | 1\|2\|8,\|085 | 8\|59,410 |
| Personal Accessories | 9\|30,455 | 5\|6,409,666 |
| Overall - Summary | 2,1\|49,310 | 13\|0,787,833 |

← 430

| Product line | Return quantity |
|---|---|
| Camping Equipment | 10,475 |
| Golf Equipment | 2,613 |
| Mountaineering Equipment | 7,201 |
| Outdoor Protection | 1,167 |
| Personal Accessories | 8,660 |
| Overall - Summary | 30,116 |

← 430

Sales Actuals ← 720

| Product line | Revenue | Gross profit |
|---|---|---|
| Camping Equipment | 4\|6,455,730 | 17\|,407,\|9\|1\|6 |
| Golf Equipment | 20,\|1\|0\|5,1\|4\|0 | 10,\|278,390 |
| Mountaineering Equipment | 1\|5,880,561 | 6,\|282,838 |
| Outdoor Protection | 9\|32,109 | 59\|2,01\|1 |
| Personal Accessories | 5\|8,50\|1,7\|02 | 24,\|451,462 |
| Overall - Summary | 14\|1,875,242.63 | 59,\|01\|2,616.8\|6 |

Profit Contributors 420

(bubble chart showing: Sleepi..., Woods, Na..., Eyewear, Watches, Irons, Packs, Tents, Cooki..., To...)

← 430

Sales Actuals - Same Period Last Year

| Product line | Revenue | Gross profit |
|---|---|---|
| Camping Equipment | 34,596,253 | 12,244,023 |
| Golf Equipment | 12,732,708 | 6,042,043 |
| Mountaineering Equipment | 8,487,745 | 3,337,502 |
| Outdoor Protection | 1,957,392 | 1,220,851 |
| Personal Accessories | 42,292,709 | 17,196,850 |
| Overall - Summary | 100,066,807 | 40,041,268 |

*Motio PDF Compare: Differences [1 - 34]* ← 601

Monthly Snapshot [-v2] ← 430

For Period: 6/1/2012 to 6/30/2012

Forecast

| Product line | Expected volume | Forecast revenue |
|---|---|---|
| Camping Equipment | 6⃟90,147 | 4⃟2,470,548 |
| Golf Equipment | 10⃟6,376 | 1⃟8,258,407 |
| Mountaineering Equipment | 3⃟16,062 | 1⃟4,26⃟0,176 |
| Outdoor Protection | 1⃟3⃟0,647 | 8⃟76,598 |
| Personal Accessories | 9⃟49,064 | 5⃟7,537,860 |
| Overall - Summary | 2,1⃟92,296 | 13⃟3,403,590 |

Returns

| Product line | Return quantity |
|---|---|
| Camping Equipment | 11,522 |
| Golf Equipment | 2,874 |
| Mountaineering Equipment | 7,921 |
| Outdoor Protection | 1,284 |
| Personal Accessories | 9,526 |
| Overall - Summary | 33,128 |

Sales Actuals

| Product line | Revenue | Gross profit |
|---|---|---|
| Camping Equipment | 4⃟7,384,845 | 17⃟,581⃟,9⃟9⃟6 |
| Golf Equipment | 20,5⃟0⃟7,2⃟4⃟3 | 10,⃟381,174 |
| Mountaineering Equipment | 1⃟6,198,173 | 6,345,666 |
| Outdoor Protection | 9⃟50,751 | 59⃟7,93⃟1 |
| Personal Accessories | 5⃟9,67⃟1,7⃟36 | 24,⃟695,977 |
| Overall - Summary | 14⃟4,712,747.48 | 59,60⃟2,743.0⃟3 |

Profit Contributors ← 421

(Bubble chart showing: Cooking..., Woods, Tools, P, Eyewear, Tents, Bi..., Irons, Packs, Watches, Sleeping, Navi..., R..., La..., Kn...)

← 430

Sales Actuals - Same Period Last Year

| Product line | Revenue | Gross profit |
|---|---|---|
| Camping Equipment | 34,596,253 | 12,244,023 |
| Golf Equipment | 12,732,708 | 6,042,043 |
| Mountaineering Equipment | 8,487,745 | 3,337,502 |
| Outdoor Protection | 1,957,392 | 1,220,851 |
| Personal Accessories | 42,292,709 | 17,196,850 |
| Overall - Summary | 100,066,807 | 40,041,268 |

SUPPLEMENTAL SYSTEM FOR BUSINESS INTELLIGENCE SYSTEMS TO PROVIDE VISUAL IDENTIFICATION OF MEANINGFUL DIFFERENCES

CROSS-REFERENCE TO RELATED APPLICATIONS

This application is a continuation in part of U.S. patent application Ser. No. 15/076,437, which was filed on Mar. 21, 2016 and is entitled "Supplemental System for Business Intelligence Systems," and is a continuation of U.S. patent application Ser. No. 14/147,416, which was filed on Jan. 3, 2014 and issued as U.S. Pat. No. 9,292,822 and is entitled "Supplemental System for Business Intelligence Systems," and which claims priority to and the benefit under 35 U.S.C. § 119(e) of U.S. Provisional Patent Application No. 61/856,569, entitled "Supplemental System for Business Intelligence Systems," filed on Jul. 19, 2013, all of which are hereby incorporated by reference for all purposes. U.S. patent application Ser. No. 14/147,416 application is also a continuation-in-part of U.S. patent application Ser. No. 13/369,210, entitled "Continuous Integration of Business Intelligence Software," filed Feb. 8, 2012, and is a continuation of U.S. patent application Ser. No. 12/982,560 now issued as U.S. Pat. No. 8,140,477, entitled "Continuous Integration of Business Intelligence Software," filed Dec. 30, 2010, which is a continuation of U.S. patent application Ser. No. 11/324,603 now issued as U.S. Pat. No. 7,885,929, entitled "Continuous Integration of Business Intelligence Software," filed Jan. 3, 2006, all of which are incorporated by reference herein for all purposes. This application is also related to U.S. patent application Ser. No. 12/982,620 now issued as U.S. Pat. No. 8,285,678, entitled "Continuous Integration of Business Intelligence Software," filed Dec. 30, 2010, which is incorporated by reference herein for all purposes.

TECHNICAL FIELD

The present invention relates to business intelligence systems.

BACKGROUND

As companies continue to collect a wide variety of data, business intelligence systems may be utilized to evaluate the collected data. Business intelligence systems can collect and analyze data to provide historical information, current operational information, and/or predictive information. For example, a business intelligence system may be utilized in data mining analyses to facilitate business decision-making.

SUMMARY

In various implementations, Enhanced Business Intelligence Artifact Outputs may be generated to facilitate a targeted comparison of Business Intelligence Artifacts and/or to facilitate identification of meaningful differences between Business Intelligence Artifacts. For example, the specifications of one or more Business Intelligence Artifacts may be analyzed by a Supplemental (SI) System. A set of expressions to exclude (e.g., one or more expressions to exclude) may be matched to specification elements in which differences in associated output regions may not be considered meaningful (e.g., to the user). The specifications may be instrumented such that exclude specification markers may be injected into the specification proximate to the matched specification elements. During the execution of an instrumented Business Intelligence Artifact specification to produce a BI Artifact Output, the injected specification markers may cause output regions emitted by a matched specification element to be rendered with a configured visual exclude style. A comparison of the Business Intelligence Artifact Outputs generated from the instrumented specifications may then be utilized to identify meaningful differences between the compared Business Intelligence Artifacts, while ignoring any differences occurring in output regions (e.g., of the Business Intelligence Artifact Outputs) associated with the exclude style. Identification of meaningful differences (e.g., as opposed to every difference) may facilitate review of differences for users and increase user satisfaction and/or confidence (e.g., since a user is less likely to be overwhelmed by differences when comparing a plurality of differences and/or miss differences that may be easily missed such as small in scale differences). For example, business stakeholders may be reluctant to upgrade their Business Intelligence Environment to a different version of the Business Intelligence Software, fearing that the upgrade may have widespread, unintended and/or detrimental effects on the Business Intelligence Outputs generated by the environment. Identification of meaningful differences between Business Intelligence Artifacts and/or the Business Intelligence Artifact Outputs produced by the Business Intelligence Artifacts may facilitate the identification of meaningful differences while ignoring immaterial differences. The meaningful differences may then be addressed (e.g., by applying changes to the Business Intelligence Artifact and/or Business Intelligence Artifact specification to cause it to generate the "expected" Business Intelligence Artifact Output, such as a Business Intelligence Artifact Output similar to a Business Intelligence Artifact Output generated by the Business Intelligence Artifact to which it is being compared, when executed within the Business Intelligence Environment, adjusting the configuration of a BI Ecosystem Component, applying changes to a related Business Intelligence Artifact, applying changes to an underlying data source, etc.). In some implementations, identification of meaningful differences in BI Artifact (e.g., via a comparison of the Business Intelligence Artifact Outputs the Business Intelligence Artifacts produce) may facilitate identification of meaningful changes after the deployment of a set of updates to Business Intelligence Artifacts or after updates to one or more components utilized by a Business Intelligence Environment. In some implementations, different Business Intelligence Artifacts within the same Business Intelligence Environment may be compared to identify meaningful differences to further quality, maintenance or standardization based initiatives (e.g., Business Intelligence Artifact Output requirements across an enterprise).

In various implementations, a first set of expressions may be retrieved. The first set of expressions may be generated automatically and/or manually (e.g., by a user). A first specification associated with a first Business Intelligence Artifact in a first Business Intelligence Environment and a second specification associated with a second Business Intelligence Artifact in a second Business Intelligence Environment may be retrieved. Each expression in the first set of expressions may be evaluated to identify a set of matched immaterial elements in the first specification and to identify a set of matched immaterial elements in the second specification. One or more exclude specification markers may be injected proximate to each of the identified matched immaterial elements in the first specification to generate a first instrumented specification and/or injected proximate to each of the identified matched immaterial elements in the second specification to generate a second instrumented specification. The exclude specification marker may include an exclude style. The first instrumented specification may be executed in the first Business Intelligence Environment to generate a first Business Intelligence Artifact Output. The second instrumented specification may be executed in the second Business Intelligence Environment to produce a second Business Intelligence Artifact Output. The first Business Intelligence Artifact Output and/or the second Business Intelligence Artifact Output may include output marker(s) associated with at least one of the injected exclude specification markers. Output markers may be generated based on one or more visual formatting rules of associated injected specification marker(s) and/or may include one or more visual characteristics rendered in the exclude style. A first set of images may be generated (e.g., by the SI System) that represent at least a portion of the content from the first Business Intelligence Artifact Output and/or a second set of images may be generated that represent at least a portion of the content from the second Business Intelligence Artifact Output. At least a portion the first set of images may be compared to at least a portion of the second set of images and a set of meaningful differences may be determined between the first Business Intelligence Artifact and the second Business Intelligence Artifact based on the comparison. The set of meaningful differences may include differences that are not associated with one or more of the expressions in the first set of expressions to exclude (i.e. a meaningful difference is a difference which occurs in an output region that was associated with a configured exclude style). A first Enhanced Business Intelligence Artifact Output and/or a second Enhanced Business Intelligence Artifact Output may be generated in which each output region that contains one or more of meaningful difference is visually identified in a second style (a "difference region style" or "meaningful difference region style").

Implementations may include one or more of the following features. The first Enhanced Business Intelligence Artifact Output may include the content from the first Business Intelligence Artifact Output combined with a visual identification (rendered in the difference region style) of each output region that contains one or more of the determined meaningful differences. The second Enhanced Business Intelligence Artifact Output may include the content from the second Business Intelligence Artifact Output combined with a visual identification in the difference region style of each of the determined meaningful differences. Parts of the first Business Intelligence Artifact Output identified in the exclude style may be visually identified in the first Enhanced Business Intelligence Artifact Output in the exclude style and/or parts of the second Business Intelligence Artifact Output identified in the exclude style may be visually identified in the second Enhanced Business Intelligence Artifact Output in the exclude style. In the first Enhanced Business Intelligence Artifact Output and/or the second Enhanced Business Intelligence Artifact Output, a visual identification of regions associated with one or more of the expressions in the first set of expressions to exclude may be less visually apparent to a user than the visual identification of each of the meaningful differences in the first Enhanced Business Intelligence Artifact Output and the second Enhanced Business Intelligence Artifact Output (e.g., the exclude style may be rendered as a 1 pixel border drawn in a color which is very similar to the existing background color, etc.). The visual identification of the regions associated with one or more of the expressions in the first set of expressions may include the exclude style, and the exclude style may include a color that is similar to a first color of a portion of the first Business Intelligence Artifact Output and a second color of a portion of the second Business Intelligence Artifact Output, in some implementations. Determining the set of meaningful differences may include comparing portions of the first set of images to portions of the second set of images and identifying the differences that occur in image regions that are not bounded by the exclude style. Generating a first set of images may include generating the first set of images which represent at least a portion of the content from the first Business Intelligence Artifact Output, and modifying one or more of the images in the set of images such that one or more regions contained within the exclude style are replaced with a suppress color. The second Business Intelligence Environment may be a different version of the first Business Intelligence Environment. The first Business Intelligence Artifact may be similar to the second Business Intelligence Artifact. Injecting one or more of the exclude specification markers proximate may include injecting one or more exclude specification markers before and/or after and/or into, and/or under an ancestor of each matched immaterial element. In some implementations, a request for comparison of a second portion of the content from the first Business Intelligence Artifact Output and a second portion of the content from the second Business Intelligence Artifact Output may be received. An additional first set of images which represent the second portion of the content from the first Business Intelligence Artifact Output and an additional second set of images which represent the second portion of the content from the second Business Intelligence Artifact Output may be generated. At least a portion the additional first set of images may be compared to at least a portion of the additional second set of images, and a second set of meaningful differences may be determined between the first Business Intelligence Artifact and the second Business Intelligence Artifact based on the comparison. The second set of meaningful differences may include differences that are not associated with one or more of the expressions in the first set of expressions to exclude. The first Enhanced Business Intelligence Artifact Output and the second Enhanced Business Intelligence Artifact Output may include the second portion of the first Business Intelligence Artifact Output, the second portion of the second Business Intelligence Artifact Output, and/or visually identification of the second set of meaningful differences in the difference region style. In some implementations, comparing at least a portion the first set of images to at least a portion of the second set of images may include comparing a first set of pixels in a first location of the first set of images to a second set of pixels in a first location of the second set of images. The first location of the first set of images and the first location of the second set of images may be similar. An output marker may include a border rendered in the exclude style which is emitted by the injected exclude specification marker during execution of the instrumented BI Artifact specification. The exclude style border may at least partially enclose a part of a Business Intelligence Artifact Output associated with one of the identified matched immaterial elements in the associated instrumented specification. An output marker may be in the exclude style.

In various implementations, meaningful differences between Business Intelligence Artifacts may be determined. A first Business Intelligence Artifact Output in a first Business Intelligence Environment, a second Business Intelligence Artifact in a second Business Intelligence Environment, and a first set of expressions may be retrieved. Expressions in the first set of expressions may be evaluated to identify a set of matched elements in the second specification. One or more exclude specification markers may be injected proximate to each of the identified matched elements in the second specification to generate a second instrumented specification. An exclude specification marker may include an exclude style. The first specification associated with the first Business Intelligence Artifact may or may not be instrumented. The second instrumented specification may be executed in the second Business Intelligence Environment such that the second Business Intelligence Artifact Output includes one or more output markers associated with at least one of the injected exclude specification markers. An output marker may be generated based on one or more visual formatting rules of at least one of the associated injected specification markers and may include one or more visual characteristics rendered in the exclude style. A first set of images which represent at least a portion of the content from the first Business Intelligence Artifact Output, and a second set of images which represent at least a portion of the content from the second Business Intelligence Artifact Output may be generated (e.g., via the SI System). The second set of images may include parts visually identified in the exclude style that are associated with the identified matched elements. At least a portion the first set of images may be compared to at least a portion of the second set of images. Parts of the first set and second set of images that are bounded by or associated with the exclude style may be excluded from the comparison, and a set of meaningful differences may be determined between the first Business Intelligence Artifact and the second Business Intelligence Artifact based on the comparison. The set of meaningful differences may include differences that occur in output regions that are not associated with matched specification elements from one or more of the expressions in the first set of expressions to exclude.

Implementations may include one or more of the following features. The set of determined meaningful differences may be presented to a user. For example, the set of meaningful differences may be presented to the user via a user interfaces and/or via Enhanced Business Intelligence Artifact Output(s). A first Enhanced Business Intelligence Artifact Output and a second Enhanced Business Intelligence Artifact Output may be generated for presentation to a user in which each output region that contains one or more meaningful differences is visually identified in a difference region style. The first Enhanced Business Intelligence Artifact Output may include the original content from the first Business Intelligence Artifact Output combined with a visual identification (rendered in the difference region style) of each output region that contains one or more meaningful differences. The second Enhanced Business Intelligence Artifact Output may include the content from the second Business Intelligence Output combined with a visual identification (rendered in the difference region style) of each output region that contains one or more meaningful differences. Parts of the second Business Intelligence Artifact Output identified in the exclude style may be visually identified in the second Enhanced Business Intelligence Artifact Output in the exclude style. In some implementations, determining the set of meaningful differences may include comparing portions of the first set of images to portions of the second set of images, and identifying the differences that occur in image regions that are not bounded by the exclude style. Visually identifying the determined set of meaningful differences may include visually highlighting each output region that contains one or more meaningful differences. Visual highlighting may be embedded into the Enhanced Business Intelligence Artifact Output or may be rendered as an optional overlay in an interactive viewer. In some implementations, when comparing portions of the first set of images to portions of the second set of images, one or more meaningful differences may be identified in a first image region that are within a predetermined number of pixels from a second image region including one or more other meaningful differences. A first meaningful difference region may be created to record the meaningful differences in the first image region and/or to record the fact that there are meaningful differences in the first image region, and a second meaningful difference region may be created to record the meaningful differences found in the second region and/or to record the fact that there are meaningful differences in the second image region. If an edge of the first meaningful difference region and an edge of the second meaningful difference region are within the predetermined number of pixels of each other, the first and second meaningful difference regions may be replaced by a third meaningful difference region. The third meaningful difference region may encapsulate at least the first and second meaningful difference regions. The third meaningful difference region may encapsulate the first image region, the second image region and a third image region. The third image region may be proximate the first and second image regions (e.g. adjacent to, between, etc.). The third image region may have a size that is less than the predetermined number of pixels. In some implementations, the second Business Intelligence Environment may be different version of the first Business Intelligence Environment and/or the first Business Intelligence Artifact may be similar to the second Business Intelligence Artifact. In some implementations, a request for comparison of a second portion of the content from the first Business Intelligence Artifact Output and a second portion of the content from the second Business Intelligence Artifact Output may be received. An additional first set of images which represent the second portion of the content from the first Business Intelligence Artifact Output and an additional second set of images which represent the second portion of the content from the second Business Intelligence Artifact Output may be generated. At least a portion of the additional first set of images may be compared to at least a portion of the additional second set of images, and a second set of meaningful differences may be determined between the first Business Intelligence Artifact and the second Business Intelligence Artifact based on the comparison. The second set of meaningful differences may include differences that are not associated with one or more of the expressions in the first set of expressions to exclude. A first Enhanced Business Intelligence Artifact Output and a second Enhanced Business Intelligence Artifact Output that includes the second portion of the first Business Intelligence Artifact Output, the second portion of the second Business Intelligence Artifact Output, and visually identification of the second set of meaningful differences in the difference region style may be generated.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which:

FIG. 4A illustrates an implementation of an example HTML based comparison result user interface provided by the SI System.

FIG. 4B illustrates the same an example HTML based comparison result user interface depicted in FIG. 4A.

FIG. 5A illustrates an example first BI Artifact Output that was generated by the execution of the first instrumented BI Artifact specification.

FIG. 5B illustrates an example second BI Artifact Output that was generated by the execution of the second instrumented BI Artifact specification.

FIG. 7A illustrates an implementation of an enhanced version of the first Business Intelligence Artifact Output illustrated in FIG. 5A.

FIG. 7B illustrates an implementation of an enhanced version of the second Business Intelligence Artifact Output illustrated in FIG. 5B.

Like reference symbols in the various drawings indicate like elements.

DETAILED DESCRIPTION

Figure 1:
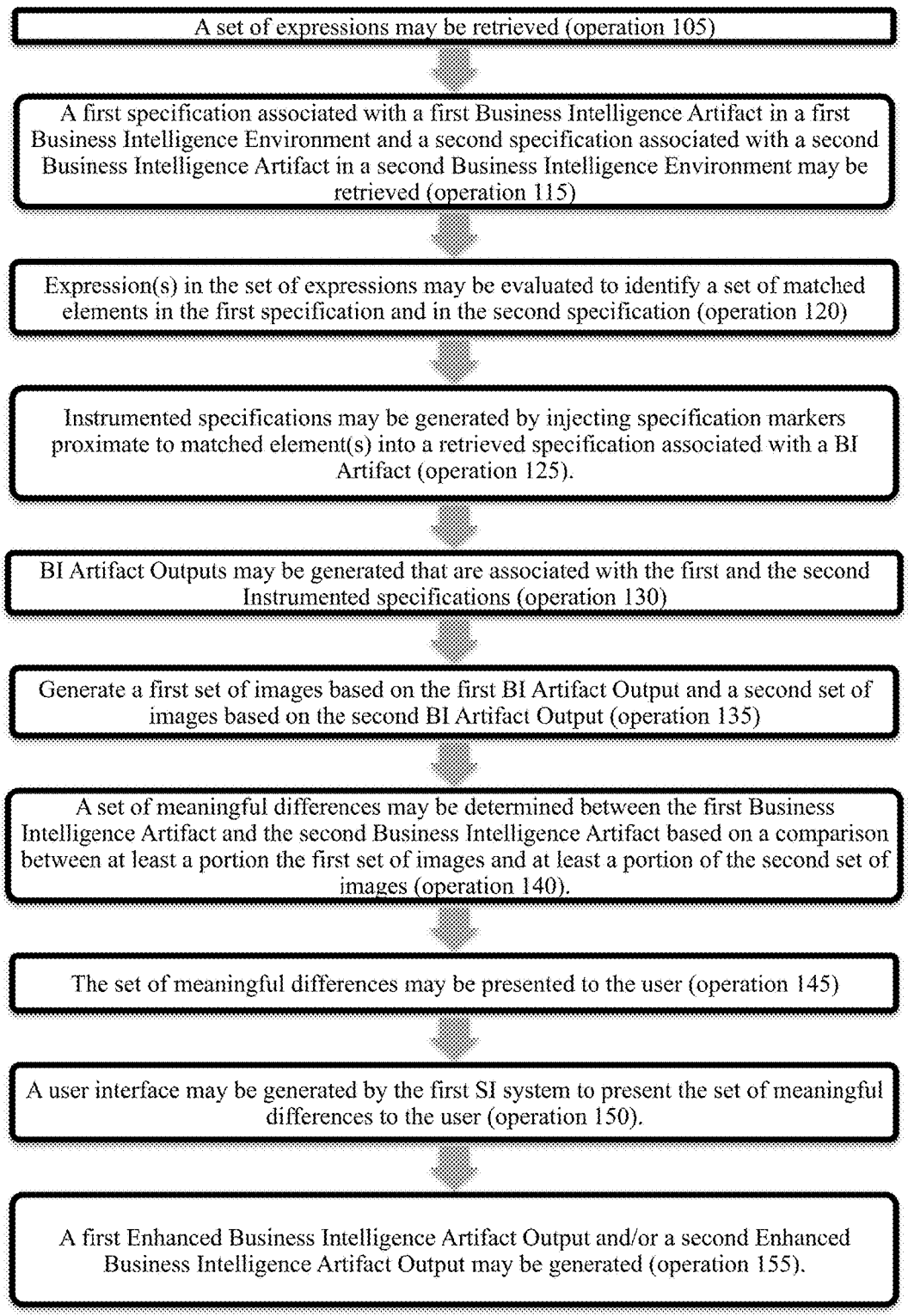
FIG. 1 illustrates an implementation of an example process for identifying differences between Business Intelligence Artifact Outputs.

In various implementations, a supplemental (SI) system may be provided for one or more Business Intelligence (BI) Environments. The supplemental system may be coupled to business intelligence environment(s) to facilitate deployment; analyses (e.g., identifications of similarities and/or differences, comparison to criteria, and/or other analyses); version control, tracking, management, and/or control; identification of differences between, for example, BI Artifacts; testing; test creation, association, and/or management; collaboration; release management; and/or other processes. In various implementations, the supplemental system (a continuous integration (CI) system and/or a modified CI system) may be utilized and the supplemental system (SI) system may include one or more features for use in and/or with a business intelligence system. For example, as described in U.S. patent application Ser. No. 15/076,437, which is incorporated fully herein to the extent it does not conflict with the described systems and processes, the SI system may be utilized to compare portions of Business Intelligence Environment(s) ("BI Environment(s)"), such as Business Intelligence Artifacts ("BI Artifacts") and Business Intelligence Artifact Outputs ("BI Artifact Outputs").

The SI system may perform targeted comparisons of two or more BI Artifact Outputs produced by the successful execution of BI Artifacts in a BI Environment. The SI system may instrument the specification of a BI Artifact prior to its execution in order to cause the emission of additional information into output regions in generated BI Artifact Outputs. The additional information allows the SI system to correlate output regions in a generated BI Artifact Output with elements in the BI Artifact Specification from which the output was produced and/or correlate output regions which are geometrically different, but generated from the same specification element (e.g., and thus related). This instrumentation and correlation may enable the SI system to perform targeted comparisons between two or more BI Artifact Outputs in order to detect meaningful differences between the compared BI Artifact Outputs while ignoring differences that are deemed immaterial or less meaningful.

In some implementations, when comparing two BI Artifact Outputs, the determination of what may be considered a meaningful difference vs. an immaterial difference may at least partially divined by the use of one or more sets of expressions. Each expression in these sets may be used to locate elements within a BI Artifact Specification. The evaluation of each expression may result in a set of zero or more matches to elements within a BI Artifact Specification. The SI system may decorate each matched element and/or one or more related elements within the BI Artifact Specification with specification markers that are designed to emit additional information into associated output regions in BI Artifact Outputs generated by the execution of the BI Artifact Specification. In some implementations, these specification markers may emit graphical and/or style characteristics, which are associated with a particular meaningful element, a set of meaningful elements, an immaterial element, and/or a set of immaterial elements from the BI Artifact Specification.

In some implementations, a first set of expressions may be used to match a first set of BI Artifact Specification elements whose associated generated BI Artifact Output regions should be considered meaningful during comparisons ("meaningful specification elements"). A second set of expressions may be used to match a second set of BI Artifact Specification elements whose associated generated BI Artifact Output regions should be considered immaterial during comparisons ("immaterial specification elements").

In some implementations, a BI Artifact Specification may be represented as an XML document, and a matched element may be an element within that XML document. The element may be matched based on an expression which selects an element in the document based various characteristics of the element or related elements (e.g. characteristics such as attribute value, element content, and/or element name). Related elements may include ancestor elements, descendent elements or sibling elements.

In some implementations, the SI system may generate a comparison result user interface that provides an SI system user with a visual display of the meaningful differences between two compared BI Artifact Outputs. In some implementations, this may include a first pane which renders a first page from a first BI Artifact Output, a second pane which renders a second page from a second BI Artifact Output, a transparent overlay on top of the first pane with a visual rendering that highlights (e.g., differentiates via a style such as a surrounding border, a translucent highlight, etc.) each region from the first page which contains meaningful differences, and a transparent overlay on the second pane with a visual rendering that highlights each region from the second page which contains meaningful differences. Visually identifying meaningful differences may facilitate identification of differences between BI Artifact Outputs in way that may increase user satisfaction (e.g., may allow quick, easy identification; identification of a portion of the differences that are meaningful to the user as opposed to all differences, etc.). In some implementations, visually identifying the meaningful differences may allow a user to identify differences that may be visually difficult for a user to identify, such as but not limited to subtle differences in charts, small (e.g., in size) changes that are meaningful to the user, subtle text or numeric changes, subtle color changes, etc.

In some implementations, paging controls may be added to the comparison result user interface to allow a user to navigate through the pages of two compared BI Artifact Outputs (e.g. "first", "previous", "next", and "last" buttons—pressing a "next" button may navigate the content shown in the first pane from page 5 of the first BI Artifact Output to page 6 of the first BI Artifact Output, and navigate the second pane from page 5 of the second BI Artifact Output to page 6 of the second BI Artifact Output). Thus, a user may navigate through a page by page comparison of the first BI Artifact Output compared to the second BI Artifact Output, with the SI system rendering visual highlighting around the meaningful difference regions between the two corresponding pages from each of the two compared BI Artifact Outputs in transparent overlays displayed on top of each page of output content. In some implementations, visual highlighting of meaningful difference regions may include providing a partially translucent background, drawing a visual border around the meaningful difference region (e.g. drawing a hot pink border around the region), or other of similar forms of visual cue that make the meaningful difference region stand out visually. In some implementations, the user may focus the comparison visualization to only output regions generated by a subset of the meaningful specification elements (e.g. on a page with many meaningful difference regions generated by a number of meaningful specification elements, the user may wish to focus the comparison view on difference regions associated with a single specification element), whereupon the comparison view may be adjusted such that output regions from the subset of meaningful specification elements are emphasized, and other output regions are hidden or de-emphasized.

In some implementations, the SI system may provide additional panes which offer additional views of the targeted comparison, for example a view which depicts a rendering of the differences between extracted text from a page from the first BI Artifact Output compared with extracted text from a page from the second BI Artifact Output (e.g. inserted text may be shown with a green background, deleted text may be shown with a red background, identical text may be depicted as black text on a white background).

In some implementations, the SI system may allow a user to adjust the sets of expressions for matching meaningful specification elements and/or immaterial specification elements by interacting with the comparison result user interface. For example, a user may interactively select an identified meaningful difference region, be presented with a list of specification elements associated with the output region(s) that are associated with the identified meaningful difference region, and then add one or more additional expressions that may match one or more of the listed specification elements (i.e. add an expression which will cause one or more of the listed specification elements to be treated as immaterial elements in subsequent comparisons).

In some implementations, the SI system may generate enhanced versions of compared BI Artifact Outputs ("Enhanced Business Intelligence Artifact Outputs"). The Enhanced Business Intelligence Artifact Outputs may include visual highlighting of meaningful difference regions rendered graphically on top of the original content of the BI Artifact Output. By way of example but not limitation, the Enhanced Business Intelligence Artifact Outputs may include visual highlighting (e.g. a translucent highlight, a visual border, etc.) of the determined meaningful difference regions, a textual marking on each page which records the difference numbers (e.g. if page 6 of a generated BI Artifact Output contained meaningful differences 6, 7 and 9, then the textual marking may read, "Differences 6-9"), a generated table of contents or set of bookmarks which allow the a viewer to quickly navigate between the meaningful differences, etc.). In some implementations, the SI System may insert additional pages into the Enhanced Business Intelligence Artifact Output (e.g. to provide the table of contents, to provide additional context about the comparison such as the name, path and/or version number of the two BI Artifacts compared, the date of the comparison, the user who initiated the comparison, the BI Environment(s) which generated the two BI Artifact Outputs, or the parameters which were used to execute the two BI Artifacts, etc.).

In some implementations, the SI system may optionally utilize the emitted visual styling associated with the injected specification markers when comparing BI Artifact Outputs to determine meaningful differences, but may then suppress or remove this same visual styling or surface different but related versions of the BI Artifact Outputs (e.g. different versions that were generated from the corresponding pre-instrumented specifications) for the purposes of visualizing meaningful differences in a comparison result user interface or in the Enhanced Business Intelligence Artifact Outputs (e.g. if the visual styling associated with injected specification markers has a non-subtle or distracting impact on the formatting of the BI Artifact Output).

Visual identification of the meaningful differences between two BI Artifact Outputs may facilitate identification of functional differences between two versions of the same BI Artifact in the same BI Environment; different BI Artifacts in the same BI Environment (e.g., to facilitate identification of very similar or redundant BI Artifacts); the same or similar BI Artifacts as executed in two different BI Environments; and/or other appropriate comparisons of BI Artifacts. For example, a variation in a first column may not be meaningful (e.g., and thus the column may be included in an expression to exclude) while variations in another column may be meaningful. The visual identification may allow a user to quickly identify differences in the second column without the distraction and/or being overwhelmed by differences in the first column.

In some scenarios, the differences between two compared BI Artifact Outputs may be impossible (or extremely tedious) for a human to efficiently identify. For example, a human may find it impossible to perceive subtle differences in the sizes or locations of elements rendered on charts or graphs (e.g. the sizes of bars on a bar chart, the size or locations of bubbles in a bubble chart, etc.). A human may find it very tedious and time-consuming to identify small differences between two sets of textual data (e.g. a list, crosstab, or pivot table which surfaces tens of thousands of numerical elements, one of which happens to be different when comparing a first BI Artifact Output to a second BI Artifact Output). In some implementations, the large volume of BI Artifacts for comparison may make the task difficult and make users less accurate in identifying differences that might be small in size but great in importance (e.g., meaningful differences).

For example, suppose a user may wish to ascertain the difference between version 6 and version 7 of a BI Artifact in a first BI Environment. The SI system may compare the instrumented BI Artifact Output from version 6 of the BI Artifact (as generated in the first BI Environment) to the instrumented BI Artifact Output from version 7 of the BI Artifact (also generated in the first BI Environment). In some scenarios, the SI system may contemporaneously instrument the specifications of version 6 and version 7 of the BI Artifact, execute the two instrumented specifications in the first BI Environment to produce their respective BI Artifact Outputs, and then compare the two BI Artifact Outputs to determine any meaningful differences. In other scenarios, the SI system may compare previously generated BI Artifact Outputs to determine any meaningful differences.

In some implementations, the SI system's ability to perform automated testing of BI Artifacts (e.g., an implementation of which is described in U.S. Pat. No. 9,292,822, which is hereby incorporated by reference) including intelligent verification and/or comparison of the generated BI Artifact Outputs may greatly improve a BI customer's efficiency and confidence when transitioning to a new or different version of any component which is utilized by the BI Environment (e.g. a newer version of the BI Software, a newer version of the RDBMS software, a different operating system, new servers, etc.), or when migrating to a new BI Environment.

For example, suppose a company has a first BI Environment which utilizes version 5.3 of the BI Software. The first BI Environment hosts 20,000 BI Artifacts which have been authored and evolved by users of the BI Environment over the past decade. As part of the company's normal business operation, these BI Artifacts may be executed in a variety of ways, and the information surfaced in the resultant BI Artifact Outputs generated by these executions may be used by business stakeholders when making critical business decisions. Now the company needs to upgrade to version 7.1 of the BI Software, but may suffer great anxiety about how the software upgrade will impact the functionality of these 20,000 existing BI Artifacts (e.g. if the BI Software upgrade causes unexpected changes to the information surfaced in the BI Artifact Outputs, then the company's business may be adversely affected).

The SI system may be utilized to determine the impact of the software upgrade on the first BI Environment by identifying BI Artifacts that are no longer functioning as expected in the newer version of the BI software. For example, for a given set of BI Artifacts, the SI system may generate test cases which are designed to execute each BI Artifact in a specified manner (e.g. with specified parameter values, requesting specified output formats, executed via a specified identity, etc.), record the resultant BI Artifact Outputs in a memory associated with the SI system, and then verify the resultant outputs or the interaction (e.g. verify that the outputs produced the expected information, verify that the executions completed within an allowed timeframe, compare the currently generated BI Artifact Output to a previously recorded BI Artifact Output, compare the currently generated BI Artifact Output to a generated BI Artifact Output from a second BI Environment, or various other assertions). In the above example, the SI system may generate test cases for the 20,000 BI Artifacts that exist in the first BI Environment. Subsequently, the SI system may execute the generated test cases. Each execution of a test case may entail executing a configured BI Artifact (in the manner prescribed by the test case) in the first BI Environment to produce one or more resultant BI Artifact Outputs, and then verifying the resultant outputs or interaction against expectations defined in the test case. In some implementations, the 20,000 generated test cases may each include an output comparison assertion that compares portions of the currently generated BI Artifact Output to an associated previously generated and stored BI Artifact Output to ensure that there are zero (or less than a configured number) meaningful differences between the current BI Artifact Output and the previously stored BI Artifact Output. Once the SI system has recorded results for the 20,000 executed test cases, the BI Software which underpins the first BI environment may be upgraded to version 7.1, and then the SI system may re-execute the 20,000 generated test cases. Any BI Artifact Outputs which have changed in a meaningful way between version 5.3 of the BI Software and version 7.1 of the BI Software will be identified by way of failures in the test cases (e.g. an output comparison assertion will fail since the currently generated BI Artifact Output has meaningful differences from the BI Artifact Output previously stored and associated with the output comparison assertion in the test case).

Taking a slightly different approach, rather than upgrading the first BI Environment, the company may decide to add a second BI Environment which utilizes version 7.1 of the BI Software, and then import the BI content from the first BI Environment into the second BI Environment. Using this approach, the SI system may be directed to re-execute the 20,000 test cases against the second BI Environment, and the assertions may be configured to compare the BI Artifact Outputs produced by the second BI Environment to those previously produced by test case execution in the first BI Environment.

For test cases which fail due to the detection of meaningful differences during a comparison assertion, an SI system user may investigate the failure and take the appropriate action, based on the perceived severity of the detected differences. For example, the user may utilize a user interface of the SI System to visualize the differences between the expected BI Artifact Output (as associated with the assertion) vs. the actual BI Artifact Output, or the user may instruct the SI System to generate enhanced versions of the compared BI Artifact Outputs, and view the meaningful differences highlighted on these enhanced outputs in a native viewer. Visual inspection of the highlighted meaningful differences may allow the user to visually quantify the severity of the differences. For example some identified meaningful differences may be deemed acceptable to the user (e.g. formatting changes that do not alter the meaning of the information), whereas some identified meaningful differences may have a negative business impact (e.g. invalid or incorrect data). For acceptable identified meaningful differences, the user may update the expectations for a previously failed test case (e.g. the user may update the expressions utilized to identify immaterial and/or meaningful specification elements in the BI Artifact specification, the user may update the stored BI Artifact Output which associated with the test case comparison assertion, etc.). For unacceptable identified meaningful differences, the user may identify the corresponding BI Artifact (or a related BI Artifact) for remediation (e.g. the BI Artifact or a related BI Artifact may require modifications in order to produce the correct BI Artifact Output from the updated or new BI Environment).

Similarly, users may provide expressions that are used to match meaningful specification elements or immaterial specification elements in the BI Artifact specification. In some implementations, the addition of an expression that identifies one or more immaterial specification elements may cause the SI system to automatically add additional expressions for classifying other specification elements as either meaningful or immaterial (for example, in a list with 5 columns, adding an expression that classifies the 3rd column as immaterial may cause the SI system to automatically add one or more expressions which classify the 1st, 2nd, 4th and 5th columns as meaningful).

In some implementations, the SI system may provide a first default set of expressions used to identify immaterial specification elements, and a second default set of expressions used to identify meaningful specification elements. In some implementations, the SI system may allow users to override these defaults with specific sets of values defined at the BI Artifact, folder, package, project, test case and/or assertion level.

In some implementations, the SI system may be configured to use different approaches with regard to the injected specification markers and subsequent comparison of BI Artifact Outputs generated from instrumented specifications. For example, in a first configuration, the SI system may utilize specification markers only for immaterial elements, and all other specification elements may be treated as meaningful. In a second configuration, the SI system may use specification markers only for meaningful elements, and all other specification elements may be considered immaterial. In a third configuration, the SI system may use specification markers for a subset of meaningful specification elements, specification markers for immaterial elements, and may treat all non-marked specification elements as meaningful. In a fourth configuration, the SI system may use specification markers for a subset of meaningful specification elements, specification markers for immaterial elements, and may treat all non-marked specification elements as immaterial.

A first BI Artifact from a first BI Environment and a second BI Artifact from a second BI Environment may be retrieved. The first BI Artifact maybe the same and/or different from the second BI Artifact. For example, the second BI Artifact may be similar to the first BI Artifact but deployed in a second BI Environment (e.g., the second BI Environment may be utilizing a different version of the BI Software than the first BI Environment). The second BI Artifact may be a different version of the first BI Artifact and deployed in the same BI Environment, in some implementations (e.g. version 6 vs. version 7 of the same BI Artifact). The identification of which BI Artifacts to retrieve may be based on user selections and/or assertions, in some implementations. In some implementations, a First BI Artifact may be selected in a First BI Environment. The SI System may deploy a copy of the First BI Artifact to a Second BI Environment to create the Second BI Artifact. Using this approach, the SI System may be used to detect functional differences between a First BI Environment and a Second BI Environment. For example, the SI System may instrument the First BI Artifact, and then execute the First Instrumented BI Artifact in the First BI Environment to produce a first BI Artifact Output. The SI System may then instrument the Second BI Artifact (which was a copy of the First BI Artifact) and then execute the Second Instrumented BI Artifact in the Second BI Environment to produce a Second BI Artifact Output. The SI System may then perform a targeted comparison of the first BI Artifact Output to the second BI Artifact Output, ignoring certain output regions and/or including certain output regions (as prescribed by the expressions used to classify related specification elements as meaningful and/or immaterial).

The specification(s) associated with the retrieved BI Artifacts may be instrumented based on the sets of expressions. For example, the SI system may analyze the specification (e.g., characters and/or sets of characters in the specification) of a retrieved BI Artifact, and evaluate each expression from a first set of expressions to identify a set of immaterial elements in the specification. If an element in the specification is determined to be an immaterial element, one or more exclude specification markers may be injected into the specification (e.g., proximate to the immaterial element) to identify output regions associated with the immaterial element. For example, the SI system may inject specification marker(s) proximate to each identified immaterial element in the specification. In some implementations, the SI system may inject specification marker(s) before, after, into an ancestor of an identified immaterial element, and/or under an ancestor of an identified immaterial element. The specification marker(s) may be a specification style marker. The specification style marker may cause specific visual styling characteristics to be emitted into Instrumented BI Artifact Output regions associated with the immaterial specification elements from the Instrumented BI Artifact. Upon execution of the Instrumented BI Artifact, the injected specification marker may cause all output regions associated with the specification marker to have the visual styling characteristics, (e.g., the exclude style), in some implementations. For example, the exclude style may include causing a border in an exclude color around and/or proximate to output regions associated with the immaterial specification element and/or associated information in BI Artifact Outputs generated using the instrumented specification. The exclude style may be any appropriate visual identification such as changes in color, font, border patterns, fill patterns, etc. In some implementations, the exclude style may not be visually distinguishable and/or slightly visually distinguishable from styles utilized in the output region that it surrounds (e.g., a color similar to but not the same as a background color or other of an associated output region).

The specifications for one or more of the retrieved BI Artifacts may be instrumented. A BI Artifact with an instrumented specification may be referred to as an instrumented BI Artifact. The successful execution of an instrumented BI Artifact or an instrumented BI Artifact Specification produces one or more BI Artifact Outputs (which at times may be referred to as either BI Artifact Outputs or instrumented BI Artifact Outputs). In some implementations, one or more BI Artifacts and/or associated instrumented or non-instrumented specifications may be retrieved (e.g., from a memory of the SI system). For example, a BI Artifact may be compared to several other BI Artifacts (e.g., to identify redundant BI Artifacts and/or when comparing versions of BI Artifacts), and the instrumented specification and/or BI Artifact Output generated from the execution of the BI Artifact with the instrumented specification may be saved (e.g., in a memory of the SI System) for later retrieval.

The BI Artifacts (e.g., to be compared) may be executed with their corresponding instrumented specifications to produce BI Artifact Outputs. For example, the first BI Artifact with a first instrumented specification may be executed in a first BI Environment to produce a first BI Artifact Output and/or the second BI Artifact with a second instrumented specification may be executed in a second BI Environment to produce a second BI Artifact Output. The BI Artifact Output(s) generated by execution of BI Artifact(s) with instrumented specification(s) may include one or more output markers associated with injected specification markers. The output marker may be a visual identification (e.g., visible to the SI system and/or users) generated based the associated injected specification marker. For example, an injected exclude specification marker may specify an exclude style that may be defined by visual formatting rules that cause output markers associated with the exclude specification marker to render visual characteristic(s) in the exclude style based on these visual formatting rules. Thus, the injection of the exclude specification marker proximate to an immaterial specification element causes zero or more associated output markers to be emitted into the generated BI Artifact Output in the exclude style proximate to output regions generated by the immaterial specification element. For example, the output regions associated with an immaterial specification element and/or associated information may be at least partially surrounded by a border (e.g., in an exclude color), may be highlighted (e.g., in an exclude color), may include predetermined font color and/or style (e.g., exclude color and/or style), etc.

Similarly, a specification marker with a different associated style may be injected into a BI Artifact specification proximate to a meaningful specification element, causing output regions in the generated BI Artifact Output to be at least partially surrounded by a border, highlight, font or other visual characteristic that may associated with the meaningful specification element (by way of the style defined via the injected proximate specification marker). In some implementations, a distinct style may be used per meaningful element or a distinct style may be used per set of related meaningful elements.

In some implementations, a portion of a BI Artifact Output that is marked by an output marker rendered in an exclude style (e.g., within borders and/or highlighting, in the exclude style, etc.) may be identified as an excluded portion, and a portion of the BI Artifact Output that is marked by an output marker rendered in a style associated with a meaningful specification element may be identified as an included portion. The BI Artifact Output may contain excluded portions, included portions and other portions. In some implementations, the SI System may perform a targeted comparison of two BI Artifact Outputs by ignoring any differences in the exclude portions, correlating and comparing output regions in the include portions, and comparing or ignoring other portions.

The SI System may process a BI Artifact Output to generate a series of images which represent portions of the BI Artifact Output. In some scenarios, the SI System may convert a BI Artifact Output from an original format into a different format before generating the series of images which represent portions of the BI Artifact Output. For example, a BI Artifact Output may be originally generated by the BI Environment in SVG, HTML, MHT, PowerPoint or Excel formats and then subsequently converted by the SI System into PDF format.

At least a portion of the generated images from the BI Artifact Outputs may be compared. For example, a first image from a first section of a first BI Artifact Output and a second image from a second section of a second BI Artifact Output may be compared. The first and second images may be compared to one another by any appropriate image processing technique, such as comparisons of pixel values within the two images. In some implementations, an image may have a length and a width. A unit (e.g., a pixel) of the image may be a portion of length and a portion of the width. The unit may have a location in the image. The unit may have a color. In some implementations, the color of the unit may be represented by a numeric value (e.g. a numerical value which represents red, green and blue ("RGB") levels of the color or red, green, blue levels of the color plus a transparency level ("RGBA")). The SI system may identify comparable regions from the first and second images and then determine if the units within those regions are equivalent or different.

In some implementations, the comparison of the first and second images may ignore image regions that are decorated with, surrounded by or otherwise associated with the configured exclude style. For example, the units of a first image that are the result of generated output regions which are associated with an injected exclude specification marker in the original instrumented BI Artifact Specification may not be compared to corresponding units in the second image (e.g., units in a corresponding region from the second image).

A determination of whether differences exist between BI Artifacts may be based on this comparison of the images, correlation and comparison of corresponding include portions, and/or the identification of the excluded portions (e.g., such that the excluded portions may not be compared). For example, if a difference is identified in one or more units of the image (in a region that is not part of the excluded portions), a determination may be made that a difference exists between BI Artifacts. In some implementations, a threshold unit number may be retrieved from the SI system and/or the user and if a difference is identified in a set of units (e.g., proximate units) greater than the threshold is identified a determination may be made that a difference exists between BI Artifacts. If a difference is identified in a set of units (e.g., proximate units) that is less than the threshold, then a determination may be made that a difference does not exists between BI Artifacts. In some implementations, the images may be compared and then a determination may be made whether the identified difference is in the excluded portion or not in the excluded portion to determine whether differences exist. In some implementations, a first output region from a first BI Artifact Output and a second output region in a second BI Artifact Output may be associated with the same meaningful specification element (from their corresponding Instrumented BI Artifact Specifications), but may be present at different geometric locations in their respective outputs. For example, the first output region may be located in the upper left quadrant of page 6 of the first BI Artifact Output and the second output region may be located in the lower right quadrant of page 6 of the second BI Artifact Output. In this scenario, the SI system may correlate the first output region with the second output region (based on specific style characteristics emitted by the injected specification markers), and then compare these two regions to ascertain the differences.

In some implementations, the SI system may create a comparison result when comparing two instrumented BI Artifact Outputs. The comparison result may describe at least the portions of the two outputs compared thus far, information on each difference and/or difference region identified thus far, etc. In some implementations, the comparison result object may be created during the initial comparison of portions of the two outputs (e.g. a comparison of the first five pages from each output), and then extended as the comparison is extended to compare additional portions (e.g. extended a first time to include a comparison of pages 6-10, extended a second time to include a comparison of pages 11-15, etc.).

In some implementations, specification elements may be marked with specific and/or unique visual style markers which are designed to associate elements from the instrumented BI Artifact specification with resultant output regions in an BI Artifact Output generated by the execution of the instrumented BI Artifact specification. Using this approach, a first visual style may be utilized as a marker to exclude output regions generated by a first immaterial specification element, while a second style may be used to associate output regions generated by a second meaningful specification element, and a third style may be used to associate output regions generated by a third meaningful specification element. Utilizing this approach, the SI System may compare a first BI Artifact Output to a second BI Artifact Output by ignoring output regions that are decorated with the first style, while correlating and comparing output regions decorated with the second style to one another, and correlating and comparing output regions decorated with the third style to one another.

In some implementations, the SI System may compare a first portion of a first BI Artifact Output to a second portion of a second BI Artifact Output. For example, the SI system may compare the first five pages from the first BI Artifact Output to the first five pages from the second BI Artifact Output. In some implementations, a first set of images generated from sections in the first BI Artifact Output may be compared to a second set of images generated from sections the second BI Artifact Output. The first set of images may be associated with a range of pages from the first BI Artifact Output (e.g., pages 1-5, pages 6-10, etc.) and/or any other appropriate portion. The second set of images may be associated with a range of pages from the second BI Artifact Output (e.g. pages 1-5, pages 6-10, etc.) and/or any other appropriate portion. The results of the comparison may be presented visually to a user. By way of example, but not limitation, the SI System may present a first page from the first BI Artifact Output beside a second page from the second BI Artifact Output. The SI System may visually highlight the differences between the first and second pages in an optional overlay shown on top of the first page and an optional overlay shown on top of the second page. A user may request to extend the initial comparison to include additional pages from the first and second BI Artifact Outputs (e.g. pages 6-10), whereupon the SI system may extend the comparison to include the additional pages.

In some implementations, the result of the comparison of the first portions of the first BI Artifact Output to a second portion of the second BI Artifact Output may be presented to a user while the SI System compares additional portions from the first and second BI Artifact Outputs. The results of the comparison of one or more of the additional portions may be presented to the user (e.g., automatically and/or upon request of the user). In some implementations, an assertion associated with the comparison may be an assertion to determine if a difference exists (or if a certain maximum number of differences exist). The images may be analyzed in portions (e.g., sequentially by pages, by likelihood of differences existing, by output regions generated by the same specification expression, etc.) until a difference is identified. This portion-wise analysis may increase the efficiency of the assertion.

In some implementations, during comparison, the SI system may identify one or more difference regions in the compared outputs. A difference region may be a rectangular region which encapsulates one or more detected meaningful differences, in some implementations. The SI System may record the coordinates (e.g., in reference to a location on an image or portion thereof) of the difference region to record the detected meaningful difference, in some implementations. By way of example, but not limitation, if a first output region is compared to a second output region, and 23 pixels in close proximity to one another are found to be different, then the SI system may record a difference region which encapsulates at least the surrounding area of the 23 pixels found to be different. For a first detected difference pixel and a second detected difference pixel, the SI system may consider the distance between the first detected difference pixel and the second detected difference pixel when determining if they may be included in the same difference region. In some implementations, the SI system may utilize a configurable pixel distance threshold for this determination, where the pixel distance threshold represents the maximum distance between two difference pixels in the same difference region.

In some implementations, difference regions may be "padded" by a configurable number of pixels. For example, adding 4 pixels of padding on the top, right, bottom & left of the difference region may make the actual pixel differences in that region more apparent to the human eye when the SI system renders a visualization of the comparison (e.g. a first output page beside a second output page, with a transparent overlay on each page that highlights the difference regions on top of the original content from each page).

In some implementations, a first difference region and a second difference region which are in close proximity to one another may be replaced by a third consolidated difference region. The consolidated difference region encapsulates at least the area of the first and second difference regions. In some implementations, the SI system may utilize a configurable difference region collapse threshold when determining whether to consolidate a first difference region into a second difference region. The configurable difference region collapse threshold may represent the maximum number of pixels between two difference regions that may be consolidated.

In some implementations, various operations of the process may be deleted and/or modified. Various operations may be added to the described process or portions thereof, in some implementations.

In some implementations, the SI system may compare a first portion of a first instrumented BI Artifact Output to a second portion of a second instrumented BI Artifact Output. In some implementations, a first set of images generated from the first portion may be compared to a second set of images generated from the second portion. In some implementations, an image may be generated for each compared page of a BI Artifact Output, while in other implementations, an image may be generated for smaller or larger sections of a compared BI Artifact Output (up to and including the entire BI Artifact Output). In some implementations, the generated images may be copied and/or modified by the SI system during the comparison process. By way of example, but not limitation, given a first image generated from a first portion of a first instrumented BI Artifact Output and a second image generated from a second portion of a second instrumented BI Artifact Output, the SI system may modify the first image to create a first modified image, and modify the second image to create a second modified image, and then compare the first modified image to the second modified image to determine a set of differences between the first portion and the second portion. For example, in one implementation, the SI system may modify the first and second images by first identifying a set of regions in each image that are bounded by a configured exclude style border, and then setting all of the pixel values in each identified region (including the region border) to a configured suppression color.

In various implementations, portions of the SI system may be implemented using systems similar to the described systems in U.S. patent application Ser. No. 15/076,437. For example, the SI system may retrieve and/or execute BI Artifacts and/or associated specifications. The SI system may instrument specifications and configure features of injected specification markers.

In various implementations, the SI System may be used to determine meaningful differences between Business Intelligence Artifacts. For example, a user may seek comparison of similar BI Artifacts in different BI Environments and/or different versions of the same BI Environment. In some implementations, a user may seek comparison of different BI Artifacts for goals, such as ensuring that a large number of BI Artifacts are producing expected outputs in a new version of the BI Software, in a different but similar environment, after a BI Ecosystem component change, etc. In some implementations, a user may seek comparison of different versions of BI Artifacts.

FIG. 1 illustrates an implementation of an example process for identifying meaningful differences. FIGS. 2A-2D illustrate an implementation of an example BI Environment authoring studio, such as Cognos authoring studio, being used to edit the specification of an example BI Artifact. FIGS. 3A, 4A, 4B, 5A, 5B, 6, 7A and 7B depict example user interfaces generated during an implementation of a process in which targeted comparisons are performed by the SI System.

Figures 1, 2A:
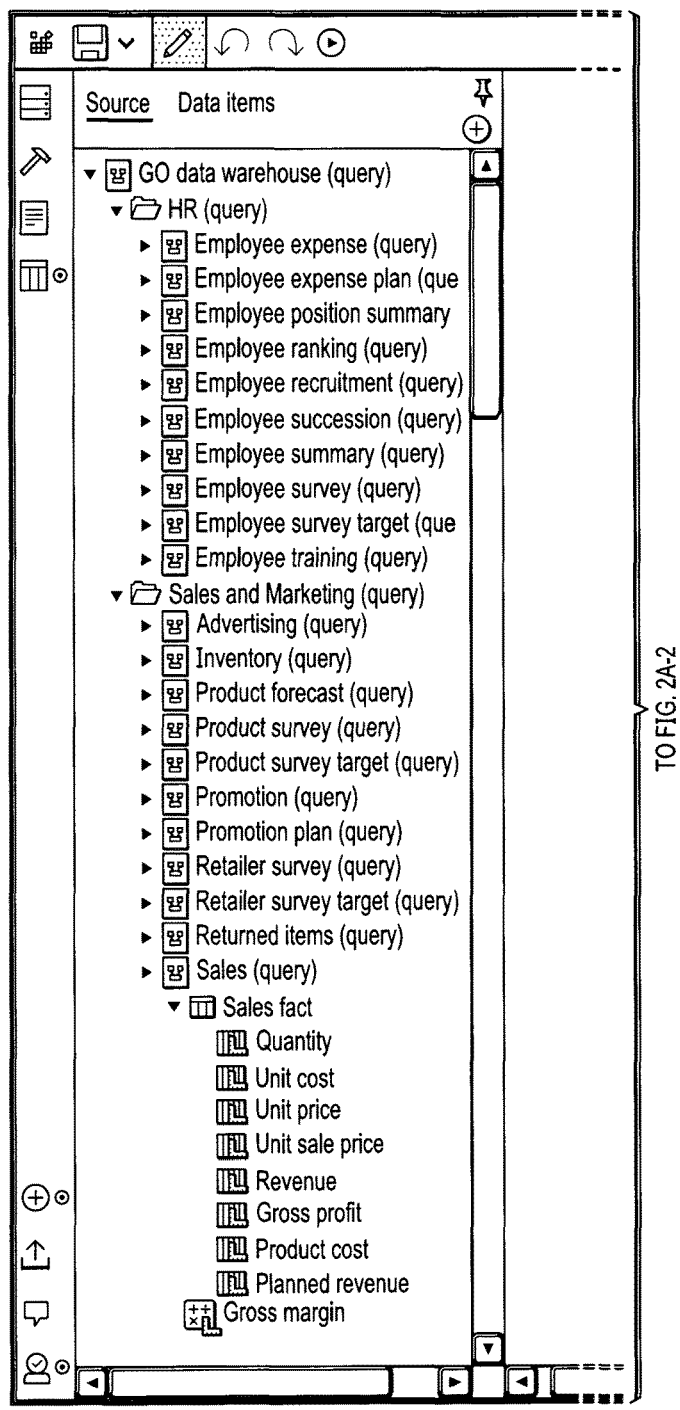
FIG. 2A illustrates an implementation of an example Cognos authoring studio being used to edit the specification of an example BI Artifact named "Monthly Snapshot" (201), in which a packed bubble chart object (202) is selected in the center pane and the bubble chart's properties (203) are shown on the right.
Figures 2, 2A:
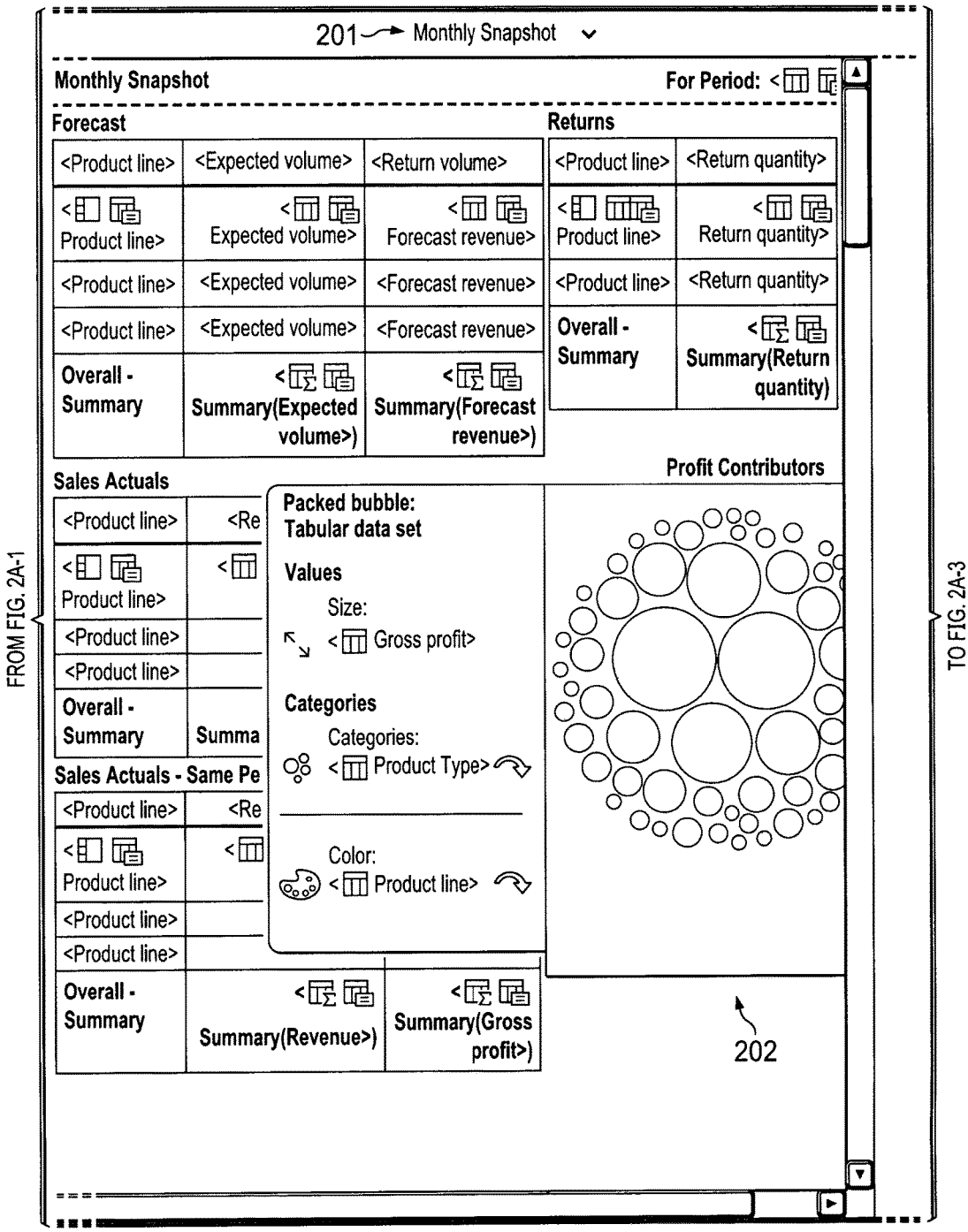
Figures 2, 2B:
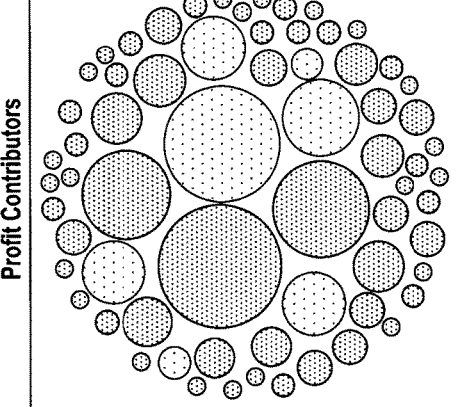
FIG. 2B illustrates an implementation of an example of a continuation of the editing session depicted in FIG. 2A, in which a list object (210) has been selected in the center pane and its properties are shown on the right pane.
Figure 2C:
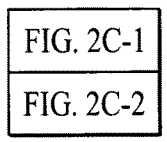
FIG. 2C illustrates an implementation of an example of a continuation of the editing session depicted in FIG. 2A-2B, in which the editor has been switched to a "Page Structure" view (220).
Figures 1, 2C:
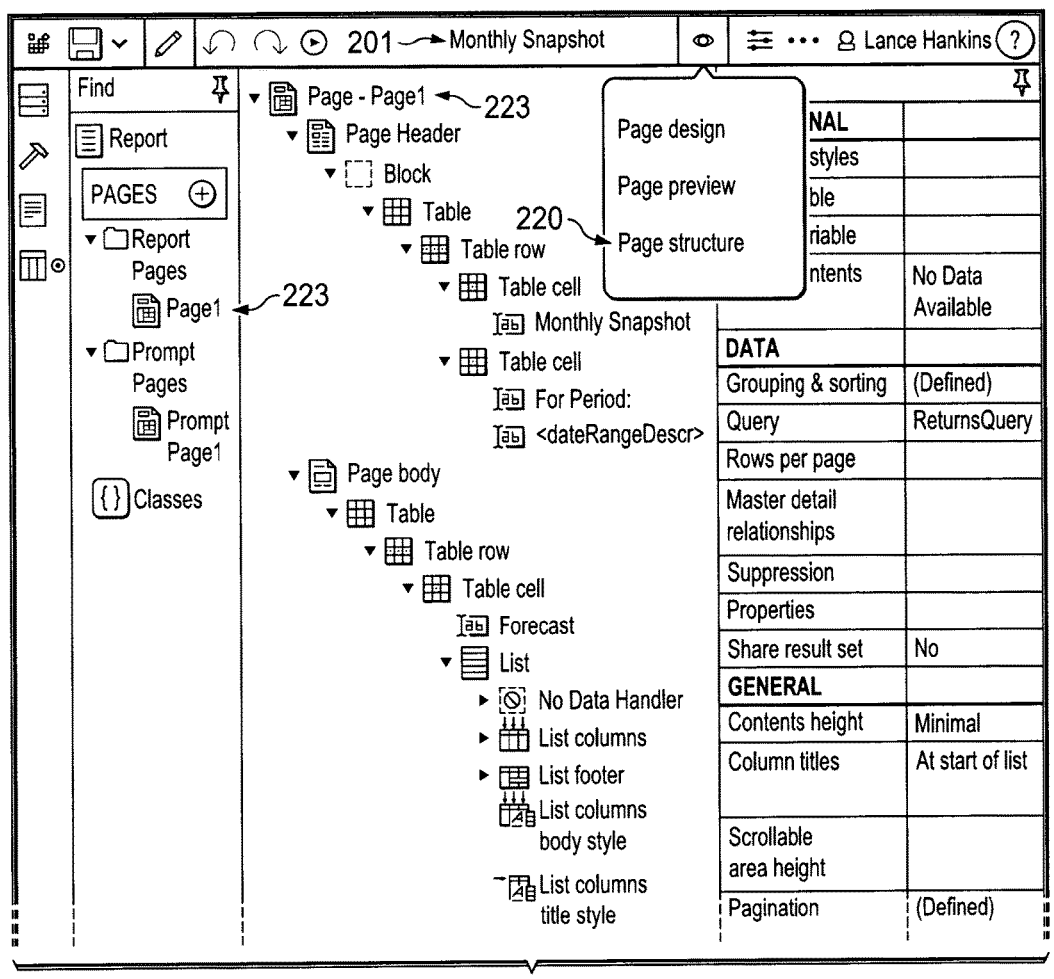
Figures 2, 2C:
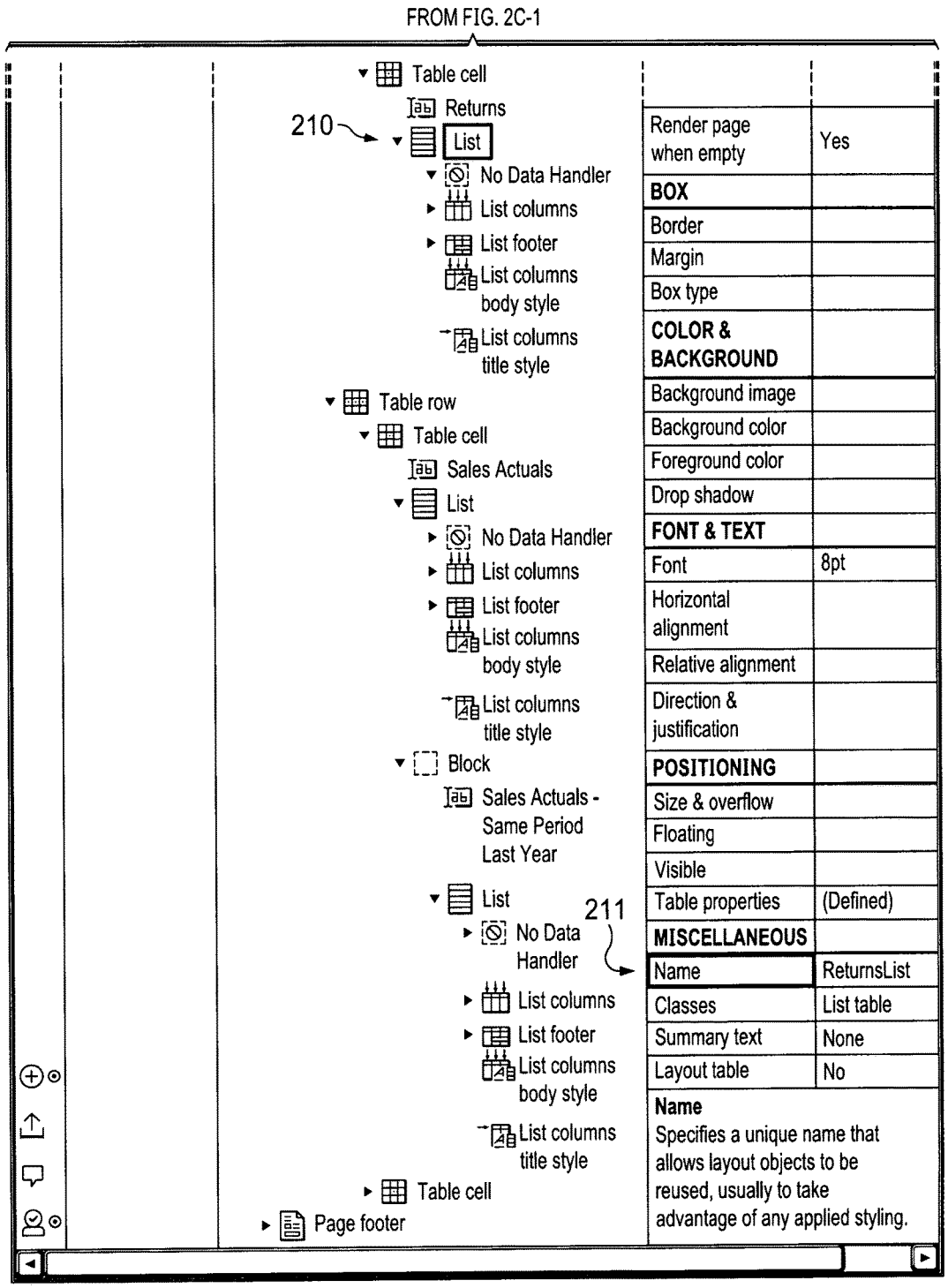
Figures 1, 2D:
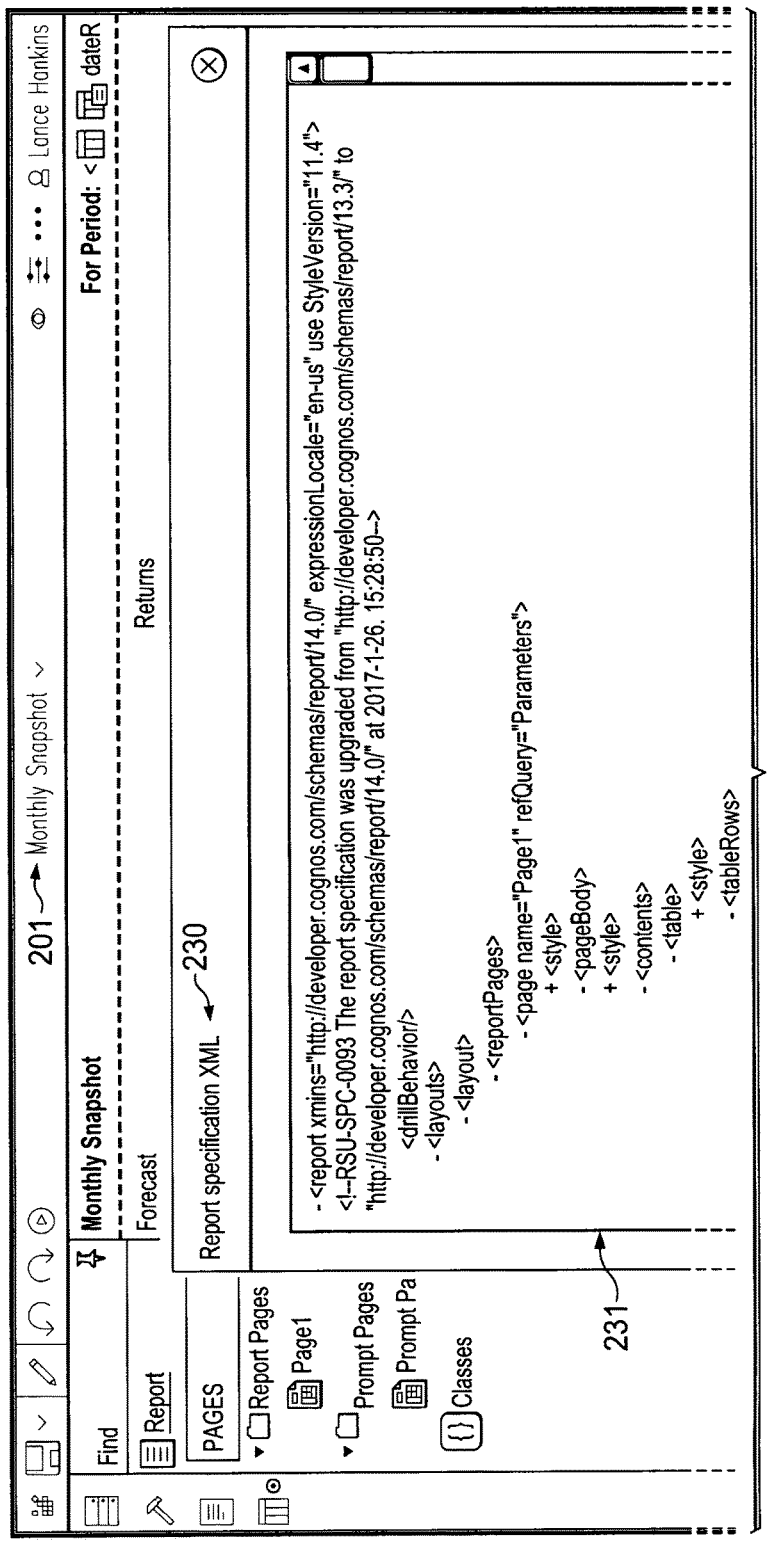
FIG. 2D illustrates an implementation of an example of a continuation of the editing session depicted in FIG. 2A-2C, in which a menu option in the authoring studio has been selected which displays the underlying BI Artifact specification in XML format (230).
Figures 2, 2D:
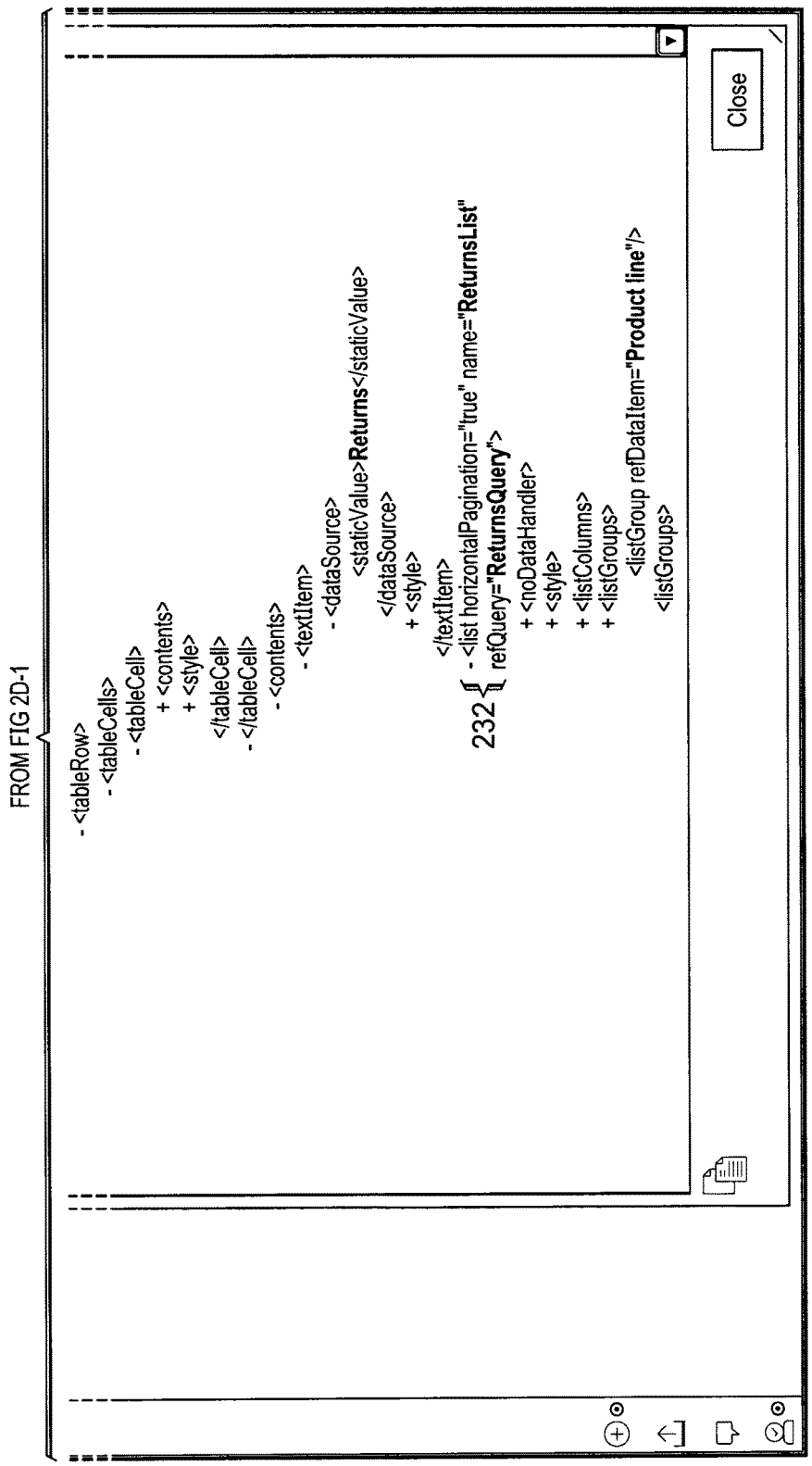

In various implementations, a user may author, edit and/or delete BI Artifacts and/or their associated specifications within a BI Environment. A SI System may be configured to operate with this BI Environment. As illustrated in FIG. 2A, a Cognos authoring studio is being utilized by a user to edit the specification of a BI Artifact named "Monthly Snapshot" (201), in which a packed bubble chart object (202) is selected in the center pane and the bubble chart object's properties (203) are shown on the right. As illustrated in FIG. 2B, a list object (210) has been selected in the center pane and its properties are shown on the right pane. The name property of the selected list object is "ReturnsList" (211). As illustrated in FIG. 2C the editor of Cognos has been switched to a "Page Structure" view (220), which causes the center pane to depict a hierarchical view of the objects underneath the "Page 1" object (223) of the BI Artifact specification. The List object (210) with a name property of "ReturnsList" (211) is selected in the hierarchical view. As illustrated in FIG. 2D a menu option in the authoring studio has been selected which displays the underlying BI Artifact specification in XML format (230). A small portion of the XML, specification is visible in the scrollable pane (231), and a list element with a name attribute of "ReturnsList" (232) is depicted in the pane, where the list element (232) and its child elements are used to represent the list object (210) depicted in FIGS. 2B and 2C.

A user may utilize the SI System to determine whether meaningful differences exist between BI Artifacts. The SI System may automatically and/or in combination with user provided information compare the BI Artifacts and determine whether meaningful differences exist. A set of expressions may be retrieved (operation 105). The first set of expressions may be stored in a memory of the SI System (e.g., as described in U.S. patent application Ser. No. 15/076, 437) in some implementations. The first set of expressions may include pre-identified expressions and/or custom expressions. The first set of expressions may be generated automatically and/or manually (e.g., by a user). For example, custom and/or selected expressions may be received from a user (operation 110). The SI System may present commonly used expressions, previously established expressions, and/or default expressions and a user may select from the presented expressions to create the set, in some implementations.

Figure 3A:
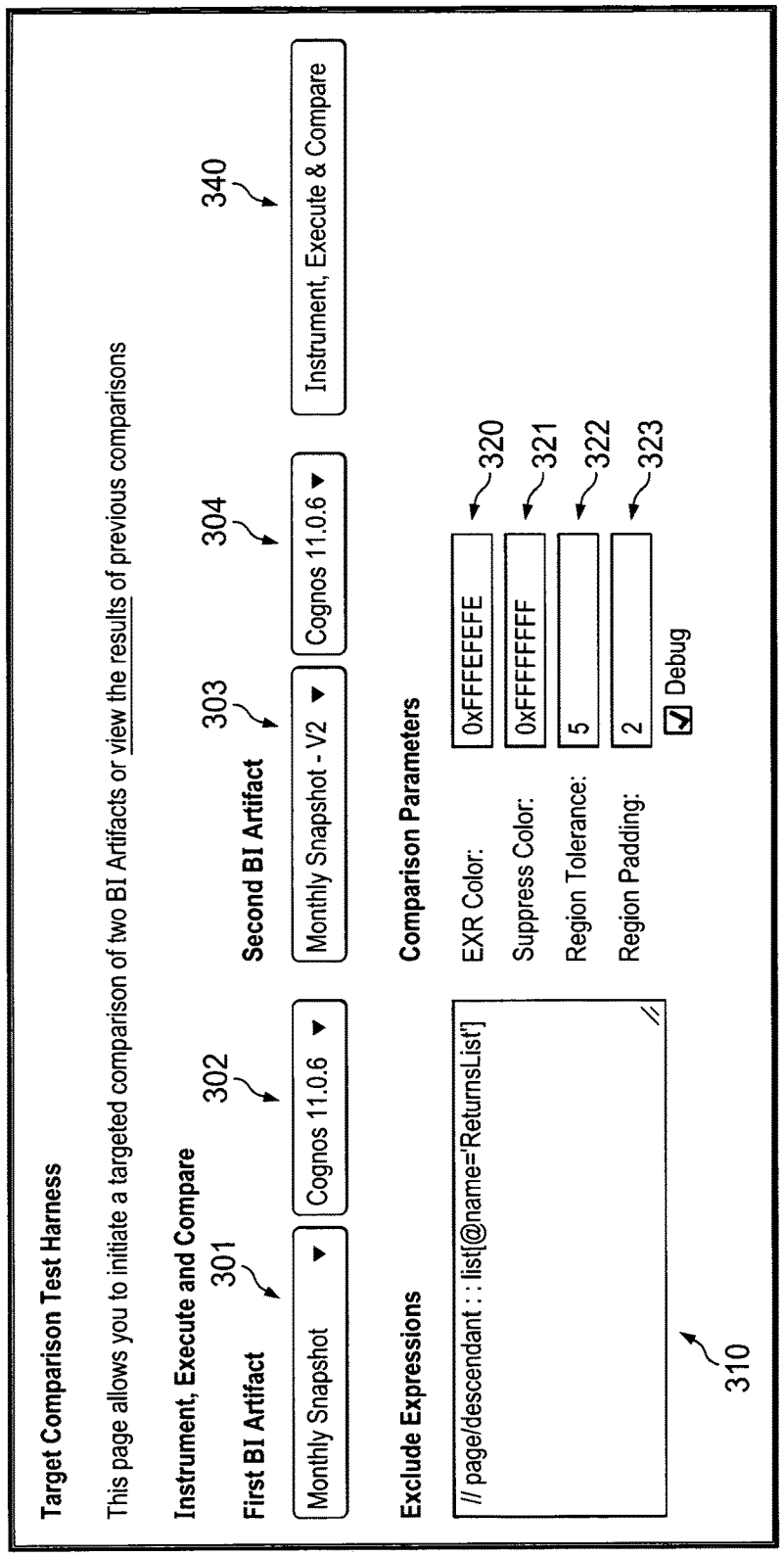
FIG. 3A—illustrates an implementation of an example user interface of the SI System which allows a user to initiate a targeted comparison between a first BI Artifact (301) in a first BI Environment (302) and a second BI Artifact (303) in a second BI Environment (304).

FIG. 3A illustrates an implementation of an example user interface of the SI System which allows a user to initiate a targeted comparison between a first BI Artifact (301) in a first BI Environment (302) and a second BI Artifact (303) in a second BI Environment (304). A user may specify a list of expressions to exclude (310) and/or provide other parameters for the comparison inputs such as, but not limited to an RGBA color value to be utilized as part of the visual exclude style (320), an RGBA color value to be used as the suppression color (321), a threshold for the maximum distance between meaningful difference regions that may be consolidated (322), and/or an amount of visual padding (323) to be added to each meaningful difference region. As illustrated, the user has specified via an exclude expression (310) that the first and second BI Artifact specification list element with a name attribute of "ReturnsList" should be treated as an immaterial element. This "ReturnsList" list element is depicted in the first BI Artifact specification as (232) in FIG. 2D. The user has further specified that the RGBA color 0xFFFEFEFE should be used as part of the exclude style (320), that the RGBA color 0xFFFFFFFF be used as the suppress color (321), that difference regions located within 5 pixels of one another may be consolidated (322) and that each difference region may be rendered with an internal padding of 2 pixels (323). As illustrated in FIGS. 2A-7B, a user has selected the "Monthly Snapshot" BI Artifact (which was shown being edited in the authoring interface in FIGS. 2A-2D) in a Cognos 11.06 BI Environment, and the "Monthly Snapshot—v2" BI Artifact (a subsequent version of the "Monthly Snapshot" BI Artifact) in the same Cognos 11.06 BI Environment. Clicking the "Instrument, Execute & Compare" button (340) may initiate a targeted comparison between the first BI Artifact and the second BI Artifact. When evaluated against the first and second BI Artifact specifications, the supplied exclude expression (310) may match the BI Artifact specification list element (232) depicted in FIG. 2D.

A first specification associated with a first Business Intelligence Artifact in a first Business Intelligence Environment and a second specification associated with a second Business Intelligence Artifact in a second Business Intelligence Environment may be retrieved (operation 115). For example, the SI System may retrieve and/or generate a copy of the specifications associated with the BI Artifacts.

Expression(s) in the set of expressions may be evaluated to identify a set of matched elements in the first specification and in the second specification (operation 120). A specification may be analyzed (e.g., by the SI System) and elements in the specification that are matched by the evaluation of an expression in the set of expressions may be identified in the set of matched elements. For example, expressions in a specification may be queried to identify at least a portion of the set of matched elements. The set of matched elements in the first specification may or may not be the same as the set of matched elements in the second specification. For example, if similar BI Artifacts (e.g., in different BI Environments) are to be compared, the matched elements may be similar between the first and second specifications. In some implementations, the matched elements may be different (e.g., in the first specification and in the second specification) since the BI Artifacts being compared are different and/or different versions of the same BI Artifact.

Instrumented specifications may be generated by injecting specification markers into a retrieved specification associated with a BI Artifact (operation 125). For example, the SI System may retrieve the specifications associated with the BI Artifacts being compared and alter the specifications. One or more exclude specification markers may be injected proximate to each of the identified matched elements in the first specification to generate a first instrumented specification and/or injected proximate to each of the identified matched elements in the second specification to generate a second instrumented specification. An exclude specification marker may include an exclude style. For example, an exclude style may be associated with visual formatting rules that when the BI Artifact and/or first instrumented specification are executed result in a portion of the BI Artifact associated with the identified matched element being visually identified in an exclude style.

During the instrumentation process, an exclude specification marker may be injected proximate to the matched list element (232) in both the first BI Artifact specification and the second BI Artifact specification. The exclude specification marker may contain a visual style that references the supplied EXR color (320) to cause output regions generated by the matched element to be encapsulated by visual characteristics specified in the exclude style when the BI Artifact is executed in the BI Environment to produce a BI Artifact Output. By way of example, but not limitation, one exclude specification marker injected into a Cognos Report Specification may take the form of an injected style element with a nested CSS element proximate to the list element 232. The nested CSS element may have a value attribute that specifies a border defined in the RGB portion of the supplied EXR color (e.g., "border: 1 pt solid #FEFEFE).

BI Artifact Outputs may be generated that are associated with the first and the second BI Artifact (operation 130). The first instrumented specification and/or first BI Artifact may be executed in the first Business Intelligence Environment to generate a first Business Intelligence Artifact Output, and the second instrumented specification and/or second BI Artifact may be executed in the second Business Intelligence Environment.

The first Business Intelligence Artifact Output and/or the second Business Intelligence Artifact Output may include output marker(s) associated with at least one of the injected exclude specification markers. An output marker may be generated based on one or more visual formatting rules of associated injected specification marker(s) and/or may include one or more visual characteristics rendered in the exclude style. For example, execution of an instrumented BI Artifact and/or instrumented specification may cause a portion of the BI Artifact Output to be in an exclude style (e.g., highlighted, stylized change, bounded by a certain type of border, etc.). This portion (e.g., an output region) in the exclude style may correspond to matched elements in an associated instrumented specification that were in the identified matched set.

The SI System may generate a set of images which represent portions of a BI Artifact Output that was generated based on the instrumented specification (operation 135). For example, the SI System may generate a first set of images based on at least a portion of the first BI Artifact Output and a second set of images based on at least a portion of the second BI Artifact Output. The set of images may include output portions in the exclude style. In some implementations, the output portions in the exclude style (e.g., an output portion at least partially enclosed in a border drawn in the exclude style) may be altered such that the output portions may be in a suppress style.

A set of meaningful differences may be determined between the first Business Intelligence Artifact and the second Business Intelligence Artifact. The set of meaningful differences may be based on a comparison between at least a portion the first set of images and at least a portion of the second set of images related to the BI Artifacts being compared (operation 140). The images may be compared and the meaningful differences may include differences between the sets of images.

Meaningful differences may not include portions of a BI Artifact Output associated with identified matched elements in an associated specification (e.g., a set of meaningful differences may include differences that are not associated with one or more of the expressions in the set of expressions to exclude and/or they may include differences that are associated with one or more expressions in the set of expressions to include). The comparison of the first set of images and the second set of images may or may not include a comparison of portions in the exclude style. For example, portions in a first set of images that are bounded by a border drawn in the configured exclude style (e.g., in an implementation of an exclude style) may be not be compared to similar portions of the second set of images. In some implementations, use of a suppress style may facilitate exclusion of these portions in the comparison. For example, the suppress style may overlay a box similar to the background color of a BI Artifact Output and/or mark text in a color similar to a background color of a BI Artifact Output such that these portions are ignored in the comparison. In some implementations, the exclude and/or suppress style may be different from the styles used in the BI Artifact Outputs to facilitate identification of the output portions associated with the expressions to exclude. In some implementations, pixels of the first set of images may be compared to pixels in a similar location on the second set of images to identify differences.

When the user clicks the "Instrument, Execute & Compare" button (340) in the example implementation depicted in FIG. 3A, the SI System may perform a targeted comparison. In some implementations, the targeted comparison may: retrieve at least a portion of the first BI Artifact from the first BI Environment, instrument the specification of the first BI Artifact to inject exclude markers proximate to any identified immaterial specification elements, execute the first instrumented specification in the first BI Environment to produce a first BI Artifact Output (e.g., an example of which is illustrated in FIG. 5A), retrieve at least a portion of the second BI Artifact from the second BI Environment, instrument the specification of the second BI Artifact to inject exclude markers proximate to any identified immaterial specification elements, execute the second instrumented specification in the second BI Environment to produce a second BI Artifact Output (e.g., an example of which is illustrated in FIG. 5B), generate a first set of images which represent a portion of content from the first BI Artifact Output, generate a second set of images which represents a portion of content from the second BI Artifact Output, compare the first set of images to the second set of images to determine a set of meaningful differences, record (e.g., in a memory of the SI System) the set of meaningful differences, and/or present (e.g., an HTML based) comparison result user interface (an example of which is illustrated in FIGS. 4A-4B) to allow the user to view the results of the targeted comparison.

The set of meaningful differences may be presented to the user (operation 145). For example, the set of meaningful differences may be presented to the user via user interfaces and/or generation of Enhanced BI Artifact outputs. The meaningful differences may be presented as overlays on associated BI Artifact Outputs, in some implementations.

A user interface may be generated by the first SI system to present the set of meaningful differences to the user (operation 150). FIGS. 4A and 4B depict an example HTML based comparison result user interface. FIG. 4A illustrates an implementation of an example HTML based comparison result user interface provided by the SI System. The comparison result user interface depicts a visual rendering of a first page (402) from the first BI Artifact Output versus a second page (404) from the second BI Artifact Output. A first transparent overlay (403) may be positioned directly over the rendering of the first page (402) and a second transparent overlay (405) is positioned directly over the rendering of the second page (404). The "highlight diffs on originals" checkbox (401) is unchecked, which means the determined meaningful difference regions are not visually rendered on the overlays (403 and 405). Output regions 420 and 421 were emitted by the matched list specification element (232), depicted in FIG. 2D, and are encapsulated by a very subtle exclude style consisting of a 1 pixel border drawn in a color with an RGBA hex value of 0xFFFEFEFE, as specified via the EXR Color parameter (320) in FIG. 3A.

FIG. 4B illustrates the same example HTML based comparison result user interface depicted in FIG. 4A. The "highlight diffs on originals" checkbox (401) has been checked, which causes the SI System to render visually highlighted regions (partially labeled as 430) onto the transparent overlays (403 and 405) for each of the meaningful difference regions which were identified when comparing the first page and the second page. The differences in the two output regions (420 and 421) are not highlighted as meaningful differences, since these two output regions (420 and 421) are surrounded by a visual characteristic defined in the exclude style, which was emitted by the injected exclude specification markers.

Initially, in some implementations, the user interface may be in the state depicted in FIG. 4A, wherein a rendering of a first page (402) from the first BI Artifact Output is shown on the left, and a rendering of a second page (404) from the second BI Artifact Output is shown on the right. A first transparent overlay (403) is layered over the top of the rendering of the first page (402) and a second transparent overlay (405) is layered over the top of the rendering of the second page (404). If the user enables the "Highlight Diffs on Originals" option (401), then the SI System may render a visual highlight around each output region (partially enumerated as 430) that contains one or more of the meaningful differences from the set of determined meaningful differences (e.g., as shown in FIG. 4B). The rendered visual highlights (430) may be rendered onto the transparent overlays (403 and 405) in the meaningful difference region style.

The output regions 420 and 421 represent output regions that were emitted by matched immaterial specification elements, are encapsulated within a visually subtle exclude style, and are therefore excluded from the targeted comparison (e.g., differences in regions 420 and 421 are not identified as meaningful differences).

In some implementations, a first Enhanced Business Intelligence Artifact Output and/or a second Enhanced Business Intelligence Artifact Output may be generated (operation 155). The determined set of meaningful differences may be visually identified in a difference region style in the Enhanced Business Intelligence Artifact Outputs. For example, the difference region style may include a color, border insertion around corresponding portions, etc. The Enhanced Business Intelligence Artifact Outputs may facilitate review of differences between BI Artifacts since meaningful differences may be quickly visually identified, while immaterial differences are deemphasized. In some implementations, the Enhanced Business Intelligence Artifact Outputs may include the content from the BI Artifact Outputs combined with an overlay which visually emphasizes the determined set of meaningful set of differences. The Enhanced Business Intelligence Artifact Outputs may be generated by the SI System, presented to a user (e.g., via an interface generated by the SI System), downloaded and viewed in a native output viewer, and/stored in a memory (e.g., of a user's device and/or SI System).

Figure 6:
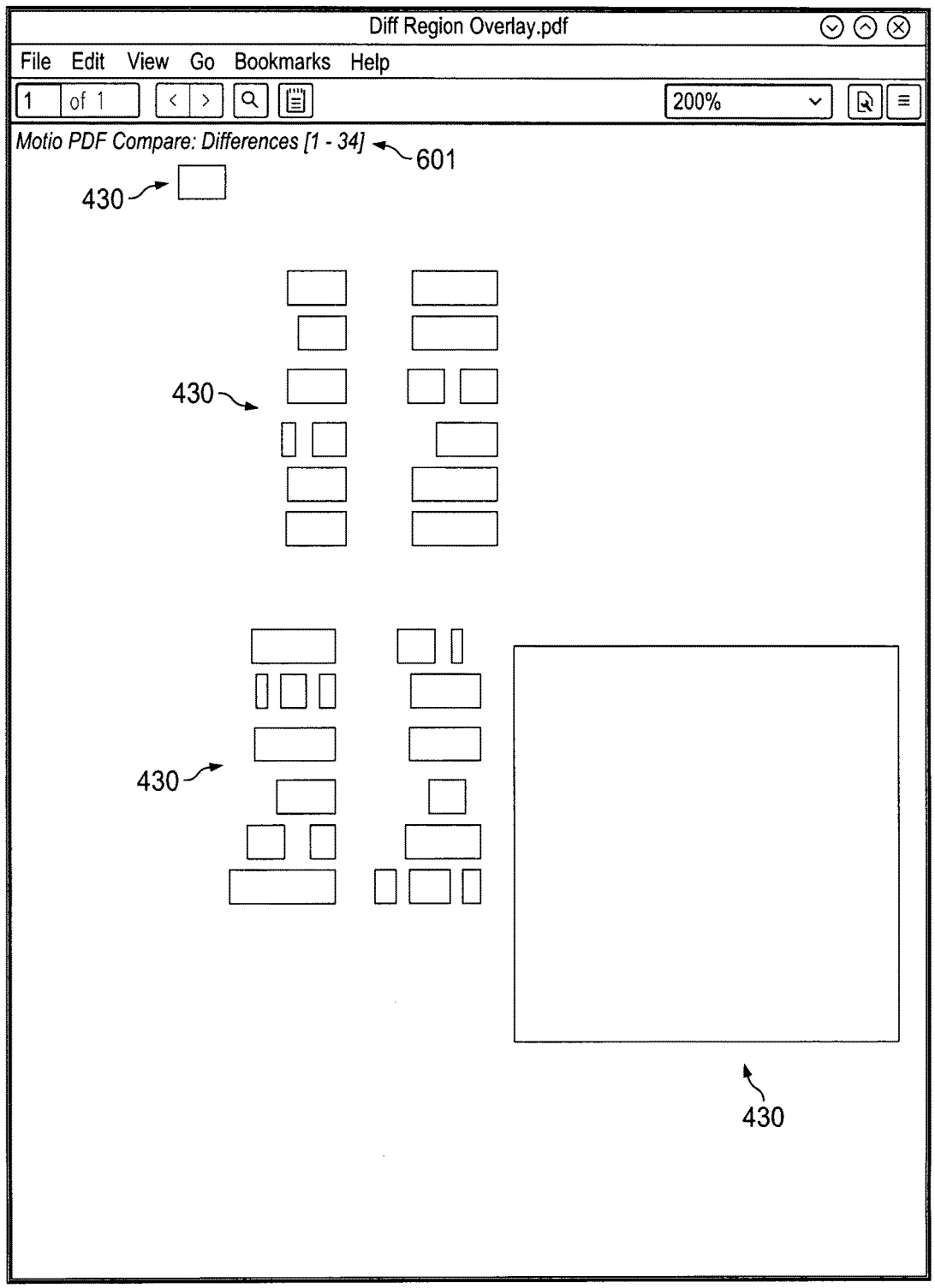
FIG. 6 illustrates an example of identified meaningful difference regions, rendered in the meaningful difference region style to an overlay in PDF form.

In some implementations, the comparison result user interface provides hyperlinks (depicted as 410 and 411 on FIG. 4A) which allow the end user to request generation of an Enhanced Business Intelligence Artifact Output. Selecting the "Download Enhanced LHS PDF" link (410) may cause the example implementation to generate the first Enhanced Business Intelligence Artifact Output (depicted in FIG. 7A) and selecting the "Download Enhanced RHS PDF" link (411) may cause the example implementation to generate the second Enhanced Business Intelligence Artifact Output (depicted in FIG. 7B). The first Enhanced Business Intelligence Artifact Output (FIG. 7A) may include at least a portion of the content from the first BI Artifact Output (FIG. 5A) combined with an overlay that depicts meaningful difference regions (FIG. 6). The second Enhanced Business Intelligence Artifact Output (FIG. 7B) may include at least a portion of the content from the second BI Artifact Output (FIG. 5B) combined with an overlay that depicts the meaningful difference regions (FIG. 6). FIG. 5A illustrates an implementation of an example first BI Artifact Output that was generated by the execution of a first instrumented BI Artifact specification and FIG. 5B illustrates an implementation of an example second BI Artifact Output that was generated by the execution of a second instrumented BI Artifact specification. The content depicted in FIG. 5A and FIG. 5B may include portions in the exclude style (420 and 421). The exclude style may or may not be visually identifiable to a user. As illustrated in FIG. 5A and FIG. 5B, the output markers (420 and 421) associated with injected exclude specification markers may be apparent to the system (e.g., SI System) but not visually identifiable to the user. FIG. 7A illustrates the enhanced version of the first BI Artifact Output (the enhanced version of the original BI Artifact Output depicted in FIG. 5A). The enhanced version of the first BI Artifact Output provides a visual rendering of the results of the SI System performing a targeted comparison on the first BI Artifact Output (depicted in FIG. 5A) to the second BI Artifact Output (depicted in FIG. 5B). The SI System visually identifies the meaningful difference regions via difference regions rendered in a difference region style (as an overlay on top of the original content). The output region (420) under the returns heading was excluded from the comparison, since it is encapsulated by visual characteristics defined in the exclude style. The SI System may add additional comparison result information to the overlay, such as a heading that displays the numerical account of meaningful difference regions on the current page (601).

FIG. 7B illustrates an implementation of an example second Enhanced Business Intelligence Artifact Output (the enhanced version of the original second BI Artifact Output depicted in FIG. 5B). The enhanced version of the second BI Artifact Output provides a visual rendering of the results of the SI System performing a targeted comparison on the first BI Artifact Output (depicted in FIG. 5A) to the second BI Artifact Output (depicted in FIG. 5B). The SI System visually identifies the meaningful difference regions via difference regions rendered in a difference region style (on top of the original content). The output region (421) under the returns heading was excluded from the comparison, since it is encapsulated by visual characteristics defined in the exclude style. The SI System may add additional comparison result information to the overlay, such as a heading that displays the numerical account of meaningful difference regions on the current page (601).

As illustrated in FIGS. 7A and 7B, the meaningful differences between the first BI Artifact Output and the second BI Artifact Output may be visually identified in the difference region style 430. The difference region style 430 may include a border around a portion 720 (e.g., output portion) of the BI Artifact Output that contains a meaningful difference. What may not be immediately apparent to the human eye is the exclude style border drawn around the 420 and 421 output portions in FIG. 5A/5B and 7A/7B. The output regions identified by 420 and 421 (e.g., under the "Returns" heading) may be surrounded by a visually subtle border rendered in the exclude style. This output region 420 may be associated with a matched immaterial element in the first instrumented BI Artifact Specification (for 5A/7A) and the output region 421 may be associated with a matched immaterial element in the second instrumented BI Artifact Specification (for 5B/7B). While not easily discernable by the human eye, the exclude style border drawn around 420 and 421 is discernable by the SI System and may be utilized to exclude the corresponding output regions during the comparison.

Process 100 may be implemented by various systems, such as the described SI system. In addition, various operations may be added, deleted, and/or modified. In some implementations, process 100 may be performed in combination with other described processes or portions thereof. For example, the first Enhanced Business Intelligence Artifact Output may include the content from the first Business Intelligence Artifact Output combined with a visual identification in the difference region style of each of the meaningful differences in the set of meaningful differences. The second Enhanced Business Intelligence Artifact Output may include the content from the second Business Intelligence combined with a visual identification in the second style of each of the meaningful differences in the set of meaningful differences. Parts of the first Business Intelligence Artifact Output identified in the exclude style may be visually identified in the first Enhanced Business Intelligence Artifact Output in the exclude style and/or parts of the second Business Intelligence Artifact Output identified in the exclude style may be visually identified in the second Enhanced Business Intelligence Artifact Output in the exclude style. In the first Enhanced Business Intelligence Artifact Output and/or the second Enhanced Business Intelligence Artifact Output, a visual identification of regions associated with one or more of the expressions in the first set of expressions to exclude may be less visually apparent to a user than the visual identification of each of the meaningful differences in the first Enhanced Business Intelligence Artifact Output and the second Enhanced Business Intelligence Artifact Output (e.g., the exclude region color may be similar to a background, a border may be presented with a 1 pixel thickness, etc.). The visual identification of the regions associated with one or more of the expressions in the first set of expressions may include the exclude style, and the exclude style may include a color that is similar to a first color of portion of the first Business Intelligence Artifact Output and a second color of a portion of the second Business Intelligence Artifact Output, in some implementations. In some implementations more than two BI Artifacts may be compared.

In some implementations, a single element from a BI Artifact specification may be responsible for the emission of more than one output region in a BI Artifact Output produced by the execution of that BI Artifact specification. For example, a BI Artifact specification that contains a first specification element (e.g., a first specification of a plurality of elements of a specification) may be executed with a first set of execution inputs in a first BI Environment to produce a BI Artifact Output that is one-thousand pages in length. On each of the pages of the BI Artifact Output, an output region may be present that was emitted by the first specification element. Each of these one-thousand output regions may be related back to the first specification element. If the BI Artifact specification is instrumented by the SI System to produce an instrumented BI Artifact specification, and during the instrumentation the first specification element is determined by the SI System to be an immaterial element, then an exclude specification marker may be injected proximate to the first specification element (e.g. on an ancestor element of the first specification element). The instrumented specification may then be executed with the first set of execution inputs in the first BI Environment to produce a BI Artifact Output. This associated BI Artifact Output may also contain one-thousand pages of output, and may also contain one-thousand output regions which are related to the first specification element. An output marker emitted by the injected exclude specification marker may be associated with each of the one-thousand output regions in the BI Artifact Output from the instrumented specification, and may cause each of the one-thousand output regions to be decorated with visual characteristics of a configured exclude style, as specified by the injected exclude specification marker.

In some implementations, determining the set of meaningful differences may include comparing portions of the first set of images to portions of the second set of images and identifying the differences that occur in image regions not bounded by the exclude style. In some implementations, comparing at least a portion the first set of images to at least a portion of the second set of images may include comparing a first set of pixels in a first location of the first set of images to a second set of pixels in a first location of the second set of images. The first location of the first set of images and the first location of the second set of images may be similar. Generating a first set of images may include generating the first set of images which represent at least a portion of the content from the first Business Intelligence Artifact Output, and modifying one or more of the images in the set of images such that one or more regions in the exclude style in the one or more images are modified with a suppress color.

In some implementations, determining the set of meaningful differences may include generating a first set of images which represents at least a portion of content from a first instrumented BI Artifact Output, generating a second set of images which represents at least a portion of content from a second instrumented BI Artifact Output, modifying the first and second sets of images to suppress regions defined in an exclude style, and comparing the modified first set of images to the modified second set of images to determine a set of meaningful difference regions. One or more meaningful differences in a first image region may be represented as a first meaningful difference region, and one or more meaningful differences in a second image region may be represented as a second meaningful difference region.

In some implementations, meaningful difference regions that are proximate to each other may be consolidated into a single, larger meaningful difference region. For example, during a targeted comparison, the SI System may identify a first meaningful difference region which encapsulates meaningful differences found in a first output region, and a second meaningful difference region which encapsulates meaningful differences found in a second output region. The first meaningful difference region and the second meaningful difference region may be within a predetermined number of pixels from each other and/or may or may not at least partially contact each other. The SI system may consolidate the first and second meaningful difference regions into a third meaningful difference region that encapsulates at least the first and second meaningful difference regions. The third meaningful difference region may encapsulate the first output region, the second output region and a third output region. The third output region may be proximate to (e.g., adjacent, between, etc.) the first output region and the second output region. The third output region may or may not include meaningful differences. For example, in some implementations, the meaningful difference regions may be visually highlighted as regular polygons (drawn in the difference region style) in an overlay (e.g. rendered into an Enhanced BI Artifact Output or via the comparison result user interface). The third meaningful difference region may be rendered as a regular polygon (drawn in the difference region style) that is large enough to encapsulate the first, second and third output regions.

The second Business Intelligence Environment may or may not be configured in the same manner, or utilize the same version of the BI Software as the first Business Intelligence Environment. The first Business Intelligence Artifact may or may not be similar to the second Business Intelligence Artifact.

In some implementations, injecting one or more of the exclude specification markers proximate may include injecting one or more exclude specification markers before and/or after and/or into, and/or under an ancestor of each identified immaterial element.

In some implementations, a request for comparison of a second portion of the content from the first Business Intelligence Artifact Output and a second portion of the content from the second Business Intelligence Artifact Output may be received. An additional first set of images which represent the second portion of the content from the first Business Intelligence Artifact Output and an additional second set of images which represent the second portion of the content from the second Business Intelligence Artifact Output may be generated. At least a portion of the additional first set of images may be compared to at least a portion of the additional second set of images, and a second set of meaningful differences may be determined between the first Business Intelligence Artifact and the second Business Intelligence Artifact based on the comparison. The second set of meaningful differences may include differences that are not associated with one or more of the expressions in the first set of expressions to exclude. The set of determined meaningful differences may be updated to include the second set of meaningful differences. The first Enhanced Business Intelligence Artifact Output and the second Enhanced Business Intelligence Artifact Output may also include the second portion of the first Business Intelligence Artifact Output, the second portion of the second Business Intelligence Artifact Output, and/or visually identification of the second set of meaningful differences in the meaningful difference region style. In some implementations, the additional described comparison(s) may be requested after a user views the initial set of meaningful differences via user interfaces and/or before the generated of enhanced BI Artifact Output(s).

The user interfaces generated to display meaningful differences may present one or more of the BI Artifact Outputs being compared. In some implementations, similar portions of the first BI Artifact Output and the second BI Artifact Output may be displayed concurrently (e.g., to facilitate review of meaningful differences). For example, a page of the first BI Artifact Output and the same page of the second BI Artifact Output may be presented concurrently. Since the BI Artifacts being compared may be similar (e.g., different versions or the related to the same BI Artifact executed in different BI Environments), the side by side comparison may facilitate review. FIGS. 4A and 4B illustrate an example implementation of a comparison result user interface that presents the results of a comparison between a first BI Artifact Output (FIG. 5A) to a second BI Artifact Output (FIG. 5B). Prior to the comparison, an expression to exclude was provided which matched specification elements in the first BI Artifact specification and second BI Artifact specification that were responsible for the emission of output regions 420 and 421 (depicted under the label "Returns"). Output regions 420 and 421 are encapsulated with an output marker rendered in the exclude style causing these output regions to be excluded from the comparison. FIGS. 4A and 4B depict a rendering of a page from the first BI Artifact Output shown on the left (402), and a rendering of a page from the second BI Artifact Output on the right (404). Selecting the 401 checkbox labeled "Highlight Diffs on Originals" may cause the SI System to render a visual border (430) shown in the meaningful region difference style around each output region that contains at least one determined meaningful difference. A link is provided that allows the user to initiate the generation and download of a first Enhanced Business Intelligence Artifact Output (410) or a second Enhanced Business Intelligence Artifact Output (411).

In some implementations, a comparison result user interface may provide an option such that the meaningful differences may or may not be visually identified. For example, the comparison user interface may include a checkbox, and selection of the checkbox may allow the meaningful differences to be visually identified. FIGS. 4A and 4B illustrates an implementation of an example user interface in which the meaningful differences may be selected (e.g., via box 401) to be visually identified. In some implementations, the user interface may allow the portions (e.g. output portions) of the BI Artifact Output associated with the expressions to exclude to be visually identified, not visually identified, and/or displayed in a highlight and/or exclude style.

In some implementations, a retrieved BI Artifact (e.g., that may or may not be instrumented) may be compared to a BI Artifact Output generated from an instrumented specification. The first and second BI Artifacts may or may not be in the same BI Environment. For example, a first BI Artifact in a first Business Intelligence Environment, a second Business Intelligence Artifact in a second Business Intelligence Environment, and a first set of expressions may be retrieved. Expressions in the first set of expressions may be evaluated to identify a set of matched elements in the second specification. The exclude specification markers (e.g., in an exclude style) may be injected proximate to each of the identified matched elements in the second specification to generate a second instrumented specification. The second instrumented specification may be executed in the second Business Intelligence Environment such that the second Business Intelligence Artifact Output include output marker(s) associated with at least one of the injected exclude specification markers. An output marker may be generated based on one or more visual formatting rules of at least one of the associated injected specification markers and may include one or more visual characteristics rendered in the exclude style. For example, a border (e.g., the exclude style) may at least partially surround a region of the BI Artifact Output identified by the output marker. A first set of images which represent at least a portion of the content from the first Business Intelligence Artifact Output, and a second set of images which represent at least a portion of the content from the second Business Intelligence Artifact Output may be generated. The second set of images may include parts visually identified in the exclude style that are associated with the identified matched elements, while the first set of images may or may not include parts visually identified in the exclude style. At least a portion the first set of images may be compared to at least a portion of the second set of images. Parts of the first set of images that are associated the parts of the second set of image visually identified in the exclude style may not compared, and a set of meaningful differences (e.g., not associated with expressions in the first set of expressions to exclude) may be determined between the first Business Intelligence Artifact and the second Business Intelligence Artifact based on the comparison.

In some implementations, in addition to and/or in place of expressions to exclude, one or more expressions to include may be utilized. During comparison of the images generated from BI Artifact Outputs, the regions associated with the expressions to include may be correlated and compared and meaningful differences may be identified based on this comparison. In some implementations, the expressions to exclude and/or expression to include may be utilized similarly to identify similarities between BI Artifacts (e.g., rather than differences being identified as described, similarities may be identified using one or more of the described operations). The identification of similarities may facilitate visual identification of similarities for compliance with corporate guidelines (e.g., for BI Artifact Outputs), etc.

The processes described and/or operations thereof may be implemented by various systems, such as the described SI system. For example, instructions stored in a memory of the system may be executed by a processor (e.g., processor of the SI system) to perform one or more of the described processes, described operations, and/or portions thereof. In addition, various operations may be added, deleted, and/or modified. In some implementations, operation(s) of the described processes may be performed in combination with other processes.

Although users have been described as a human, a user may be a person, a group of people, a person or persons interacting with one or more computers, and/or a computer system. Although in various implementations, users are described (e.g., as providing user information, validating, etc.), any security principal may be utilized. For example, a set of users to which a message is transmitted may a set of roles and/or groups to which a message may be transmitted.

In various implementations, specific BI ecosystem(s), BI environment(s), BI artifact(s), BI artifact properties(s), BI outputs, etc. have been described. However, the described system(s) and process(es) may be utilized with a variety of BI ecosystem(s), BI environment(s), BI artifact(s), BI artifact properties, and/or BI outputs. For example, an IBM Cognos BI environment and/or various components of the IBM Cognos BI have been described in various implementations as examples; however, other types of BI environments and/or components of other types of BI environments may be utilized in the described systems and processes. In some materials, "Business Intelligence" may also be referred to as "Business Analytics" or "Analytics" (e.g. beginning with version 11, IBM Cognos Business Intelligences was renamed to IBM Cognos Analytics). Although some example implementations described herein utilize Cognos Reports (a type of BI Artifact), Cognos Report Specifications (a type of BI Artifact Specification) and Cognos Report Outputs (a type of BI Artifact Output) for illustrative purposes, the system(s) and process(es) described herein are equally applicable to many types of BI Artifacts, BI Artifact specifications and BI Artifact Outputs. By way of example, but not limitation, the described system(s) and process(es) may be applied to BI environments that are comprised of and/or utilize a wide variety Business Intelligence, Business Analytics, and/or Enterprise Planning software, including Cognos Business Intelligence, Cognos Analytics, Cognos TM1, Business Objects, MicroStrategy, QlikView, Qlik Sense, Tableau, Microsoft SQL Server Reporting and/or Analysis Services, Microsoft Power BI, Tibco Spotfire, etc. The described systems and process(es) may be applied to a wide variety of BI Artifact types, by way of example but not limitation, these BI Artifact types may include Cognos Reports, Analyses, Queries, Dashboards, Stories and Active Reports; SAP Business Objects Reports and WEBI documents, Tableau Workbooks, Sheets and Views, Qlik Applications, Sheets and Reports; SSRS Reports, Power BI Reports and Dashboards; Microstrategy Reports; etc. Common structural and behavioral traits of BI Artifacts supported by the described system(s) and process(es) may include each BI Artifact being deployable in a BI Environment, and each BI Artifact possessing a BI Artifact specification (or equivalent) that may be:

a. Represented in XML, JSON, text or binary formats;
b. Editable in an authoring studio or authoring user interface that is either provided by the BI Environment or connectable to the BI Environment;
c. Composed of BI related objects and/or elements that are interpreted by the underlying BI Environment when the associated BI Artifact executed in the BI Environment to at least partially determine what data sources should be accessed, what requests for data should be issued, and how the data should be filtered, aggregated, summarized and visually presented.
d. Successfully executed (optionally with parameters) in a BI Environment to produce one or more BI Artifact Outputs in a wide variety of output formats (e.g. HTML, MHT, SVG, JSON, PDF, Microsoft Word, PowerPoint or Excel, or other formats).

Although various implementations of the described system(s) and process(es) have been described that visually surface the determined set of meaningful differences by way of an overlay embedded into an Enhanced Business Intelligence Artifact Output or rendered as part of a comparison result user interface, the determined set of meaningful differences may be visualized or utilized in other ways. For example, in some implementations, hovering over a meaningful difference region in an interactive viewer may generate a "magnifying glass view" rendered separately that displays a zoomed in view (e.g. 200% or 300% zoom) of the output region(s) that are encapsulated by the meaningful difference region. In some implementations, the "magnifying glass view" may depict a side by side zoomed view of output regions encapsulated in the meaningful difference region from a first BI Artifact Output vs. corresponding and/or related output regions from a second BI Artifact Output. In some implementations, the SI System may provide an option to visually highlight each of the detected difference pixels encapsulated within a meaningful difference region (e.g. if a meaningful difference region encapsulates an output region that is 160×100 pixels, and there are 23 difference pixels in the meaningful difference region, then the system may temporarily change the color of each of the 23 pixels to a pixel highlight style to visually highlight the difference pixels). In some implementations, the SI System may provide a concurrent navigation pane which provides a concise textual summary of each meaningful difference region in the set of determined meaningful difference regions, and allows a user to click on the textual summary to quickly navigate to a comparison result user interface or BI Artifact Output viewer to the meaningful difference region (e.g. for a 1,000 page BI Artifact Output, clicking on the textual summary of a meaningful difference region which exists on page 503 of the output may navigate the viewer pane to page 503 of the BI Artifact Output).

Systems that include computers, such as the BI environment, user devices, SI system, and/or external security sources, have been described in various implementations. The computer may include a processor that executes instructions and manipulates data to perform operations of the computer. The processor may include a programmable logic device, a microprocessor, or any other appropriate device for manipulating information in a logical manner and memory may include any appropriate form(s) of volatile and/or nonvolatile memory, such as RAM and/or Flash memory.

The memory may include data, such as lists of components of a BI ecosystem, communication protocols, sets of security principals, user identification information, format information, access lists, audit trails, historical data, business data, tests, assertions, set of users, versions (e.g., files, BI Artifacts, tests, assertions, etc.), shell BI Artifacts property sets, and/or any other appropriate information. In addition, various software may be stored on the memory. For example, instructions, such as operating systems and/or other types of software (e.g., instruction(s) and/or modules) may be stored on the memory. The instructions of the SI system and/or BI system may perform (e.g., when executed by a processor) various operations, such as the operations in the described systems and processes. For example, the instructions may retrieve expressions to exclude, expressions to include, BI Artifacts, BI Artifact Outputs, and/or specifications; analyze BI Artifact Outputs; generated and/or modify images, generate Enhanced Business Intelligence Artifact Outputs; generated graphical user interfaces to present information (e.g., BI Artifact Output, expressions to exclude, Enhanced Business Intelligence Artifact Outputs, etc.), and/or other appropriate operations. In some implementations, instructions may be combined as a single module or may be distinct modules. Modules may include various modules and/or sub-modules.

A communication interface may allow the computer to communicate with other components of the BI ecosystem, other repositories, and/or other computer systems. The communication interface may transmit data from the computer and/or receive data from other components, other repositories, and/or other computer systems via network protocols (e.g., TCP/IP, Bluetooth, and/or Wi-Fi) and/or a bus (e.g., serial, parallel, USB, and/or FireWire). Operations of the described system stored in the memory may be updated and/or altered through the communication via network protocols (e.g., remotely through a firmware update and/or by a device directly coupled to the computer).

The computer may include a presentation interface to present data to a user, such as though a monitor and speakers. The presentation interface may facilitate receipt of selections from users.

Although example computers that may be used with the disclosure have been described, the described systems and processes may be implemented through various computers such as servers, as well as a server pool. For example, the BI environment may include a general-purpose computer (PC) a Macintosh, a workstation, a UNIX-based computer, a server computer, or any other suitable device. The computer may be adapted to execute any operating system including UNIX, Linux, Windows, or any other suitable operating system. The computer may include software and/or hardware in any combination suitable to provide access to data and/or translate data to an appropriate compatible format.

Although a single processor has been described, multiple processors may be used according to particular needs, and reference to processor is meant to include multiple processors where appropriate.

A memory of the computer may include any appropriate memory including a variety of repositories, such as, SQL databases, relational databases, object oriented databases, distributed databases, XML databases, and/or web server repositories. Furthermore, memory may include one or more forms of memory such as volatile memory (e.g., RAM) or nonvolatile memory, such as read-only memory (ROM), optical memory (e.g., CD, DVD, or LD), magnetic memory (e.g., hard disk drives, floppy disk drives), NAND flash memory, NOR flash memory, electrically-erasable, programmable read-only memory (EEPROM), Ferroelectric random-access memory (FeRAM), magnetoresistive random-access memory (MRAM), non-volatile random-access memory (NVRAM), non-volatile static random-access memory (nvSRAM), and/or phase-change memory (PRAM).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable signal(s) may be non-transitory waves and/or non-transitory signals.

To provide for interaction with a user, the systems and techniques described here can be implemented on a computer having a display device (e.g., LCD (liquid crystal display) monitor) for displaying information to the user and a keyboard and a pointing device (e.g., a mouse or a trackpad) by which the user can provide input to the computer. Other kinds of devices can be used to provide for interaction with a user as well; for example, feedback provided to the user by an output device can be any form of sensory feedback (e.g., visual feedback, auditory feedback, or tactile feedback); and input from the user can be received in any form, including acoustic, speech, or tactile input.

A graphical user interface (GUI) of the interface(s) generated by the system may be displayed on a presentation interface of the user device, such as a monitor or screen. GUI may be operable to allow the user of a user device to interact with repositories and/or various interface(s). Generally, GUI provides a user with an efficient and user-friendly presentation of data provided by the system. GUI includes a plurality of displays having interactive fields, such as image icons, pull-down lists, fillable fields, and editable text operated by the user. And in one example, GUI presents an explore-type interface and receives commands from the user. It should be understood that the term graphical user interface may be used in the singular or in the plural to describe one or more graphical user interfaces in each of the displays of a particular graphical user interface. Further, GUI contemplates any graphical user interface, such as a generic web browser, that processes information in the system and/or user device and efficiently presents the information to the user. In some implementations, GUI may present a web page embedding content. The server can accept data from a user device(s) via the web browser (e.g., Microsoft Internet Explorer, Google Chrome, Firefox or Safari) and return the appropriate Hyper Text Markup Language (HTML), JavaScript Object Notation (JSON) or eXtensible Markup Language (XML) responses.

U.S. Patents and Patent Applications have been discussed and incorporated herein. The teachings of these U.S. Patents and Patent Applications are fully incorporated herein to the extent that the teachings do not conflict with the teachings of the present application.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "an expression" includes a combination of two or more expressions and reference to "style" includes different types and/or combinations of styles. Furthermore, as used in this specification, the term "all" has been used to describe an inclusion of each and every of a particular element in specific implementations. However, other implementations may include one or more of the elements rather than all, as appropriate.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular implementations of the process, machine, manufacture, composition of matter, means, methods and operations described in the specification. As one of ordinary skill in the art will readily appreciate from the disclosure, processes, machines, manufacture, compositions of matter, means, methods, or operations, presently existing or later to be developed that perform substantially the same function or achieve substantially the same result as the corresponding implementations described herein may be utilized according to the present disclosure. Accordingly, the appended claims are intended to include within their scope such processes, machines, manufacture, compositions of matter, means, methods, or operations.

The invention claimed is:

1. A method comprising:
   retrieving a first set of expressions;
   retrieving a first specification associated with a first Business Intelligence Artifact in a first Business Intelligence Environment and a second specification associated with a second Business Intelligence Artifact, wherein the first Business Intelligence Artifact is deployed in a first Business Intelligence Environment, and wherein the second Business Intelligence Artifact is deployed in a second Business Intelligence Environment;
   evaluating each expression in the first set of expressions to identify a set of matched elements in the first specification and to identify a set of matched elements in the second specification;
   injecting one or more exclude specification markers proximate to each of the identified matched elements in the first specification to generate a first instrumented specification and proximate to each of the identified matched elements in the second specification to generate a second instrumented specification, wherein each exclude specification marker comprises an exclude style;
   executing the first instrumented specification in the first Business Intelligence Environment to generate a first Business Intelligence Artifact Output and executing the second instrumented specification in the second Business Intelligence Environment to generate a second Business Intelligence Artifact Output, wherein the first Business Intelligence Artifact Output and the second Business Intelligence Artifact Output comprise one or more output markers associated with at least one of the injected exclude specification markers, and wherein each of the output markers is generated based on one or more visual formatting rules of at least one of the associated injected exclude specification markers; and wherein each of the output markers include one or more visual characteristics rendered in the exclude style;
   generating a first set of images which represent at least a portion of the content from the first Business Intelligence Artifact Output;

generating a second set of images which represent at least a portion of the content from the second Business Intelligence Artifact Output;

comparing at least a portion the first set of images to at least a portion of the second set of images;

determining a set of meaningful differences between the first Business Intelligence Artifact and the second Business Intelligence Artifact based on the comparison, wherein the set of meaningful differences comprise differences that occur in output regions that are not associated with one or more of the expressions in the first set of expressions; and generating at least one of:
a first Enhanced Business Intelligence Artifact Output or a second Enhanced Business Intelligence Artifact Output in which the determined set of meaningful differences are visually identified in a difference region style.

2. The method of claim 1 wherein the first Enhanced Business Intelligence Artifact Output comprises the first Business Intelligence Artifact Output combined with a first overlay, wherein the first overlay comprises a first visual identification in the difference region style of each of the output regions that contain one or more of the meaningful differences in the set of meaningful differences; and wherein the second Enhanced Business Intelligence Artifact Output comprises the second Business Intelligence Artifact Output combined with a second overlay, wherein the second overlay comprises a second visual identification in the difference region style of each of the output regions that contain one or more of the meaningful differences in the set of meaningful differences.

3. The method of claim 1 wherein in at least one of the first Enhanced Business Intelligence Artifact Output or the second Enhanced Business Intelligence Artifact Output, a visual identification of one or more of the output regions associated with one or more of the expressions in the set of expressions to exclude is less visually apparent to a user than a visual identification of each of the output regions that contains one or more meaningful differences in the set of meaningful differences.

4. The method of claim 3 wherein the visual identification of the regions associated with one or more of the expressions in the set of expressions to exclude comprises the exclude style, and wherein the exclude style comprises a color that is similar to at least one of a first color of portion of the first Business Intelligence Artifact Output or a second color of a portion of the second Business Intelligence Artifact Output.

5. The method of claim 1 wherein determining the set of meaningful differences comprises:
comparing portions of the first set of images to portions of the second set of images; and
identifying the differences that occur in image regions not bounded by the exclude style.

6. The method of claim 1 wherein generating the first set of images comprises:
generating the first set of images which represent at least a portion of the content from the first Business Intelligence Artifact Output; and
modifying one or more of the images in the first set of images such that one or more regions in the exclude style in the one or more images of the first set of images are modified to include a suppress color;
and wherein generating the second set of images comprises:
generating the second set of images which represent at least a portion of the content from the second Business Intelligence Artifact Output; and modifying one or more of the images in the second set of images such that one or more regions in the exclude style in the one or more images of the second set of images are modified to include the suppress color.

7. The method of claim 1 wherein visually identifying the determined set of meaningful differences comprises bounding via a first overlay one or more regions in at least a portion of the first Business Intelligence Artifact Output in the difference region style, and further comprising identifying one or more meaningful differences in a first region of the first set of images that are within a predetermined number of pixels from a second region including one or more other meaningful differences; and bounding, via the first overlay, a third region in the first Business Intelligence Artifact Output of the first Enhanced Business Intelligence Artifact Output in the difference region style, wherein the third region includes a first region associated with the first region of the first set of images, a second region associated with the second region of the first set of images, and a fourth region associated with a fourth region in the first set of images, wherein the fourth region in the first set of images is disposed at least one of between or proximate the first region of the first set of images and second region of the first set of images, wherein the fourth region has a size less than the predetermined number of pixels.

8. The method of claim 1 wherein the first Business Intelligence Environment comprises a first version of a Business Intelligence Software, and wherein the second Business Intelligence Environment comprises a second version of the Business Intelligence Software that is different from the first version of the Business Intelligence Software, and wherein the first Business Intelligence Artifact is similar to the second Business Intelligence Artifact.

9. The method of claim 1 wherein injecting one or more of the exclude specification markers proximate comprises injecting one or more exclude specification markers such that the one or more exclude specification markers are at least one of:
before each of the identified matched elements,
after each of the identified matched elements,
into an ancestor of each of the identified matched elements,
or under an ancestor of each of the identified matched elements.

10. The method of claim 1 further comprising:
presenting the set of meaningful differences via a graphical user interface prior to generating at least one of the first Enhanced Business Intelligence Artifact Output or the second Enhanced Business Intelligence Artifact Output;
in response to the presentation of the set of meaningful differences, receiving a request for comparison of a second portion of the content from the first Business Intelligence Artifact Output and a second portion of the content from the second Business Intelligence Artifact Output;
generating an additional first set of images which represent the second portion of the content from the first Business Intelligence Artifact Output;
generating an additional second set of images which represent the second portion of the content from the second Business Intelligence Artifact Output;
comparing at least a portion the additional first set of images to at least a portion of the additional second set of images;
determining an additional set of meaningful differences between the first Business Intelligence Artifact and the second Business Intelligence Artifact based on the comparison, wherein the second set of meaningful differences comprise differences that are not associated with one or more of the expressions in the set of expressions to exclude; and including the additional set of meaningful differences in the previously determined set of meaning differences between the first Business Intelligence Artifact and the second Business Intelligence Artifact.

11. The method of claim 1 wherein comparing at least a portion the first set of images to at least a portion of the second set of images comprises comparing a first set of pixels in a first location of the first set of images to a second set of pixels in a first location of the second set of images, wherein the first location of the first set of images and the first location of the second set of images are similar.

12. The method of claim 1 wherein one or more of the output markers comprise a first border injected into the first Business Intelligence Artifact Output, and wherein the first border at least partially encloses each part of the first Business Intelligence Artifact Output associated with one of the identified matched elements in the first instrumented specification; and one or more of the output markers comprise a second border injected into the second Business Intelligence Artifact Output, and wherein the second border at least partially encloses each part of the second Business Intelligence Artifact Output associated with one of the identified matched elements in the second instrumented specification, and wherein the first border and the second border are rendered in the exclude style.

13. A method comprising:
retrieving a first Business Intelligence Artifact Output from a location referenced by a memory of an Supplemental System;
retrieving a first set of expressions;
retrieving a specification associated with a Business Intelligence Artifact, wherein the Business Intelligence Artifact is deployed in a Business Intelligence Environment;
evaluating each expression in the first set of expressions to identify a set of matched elements in the specification;
injecting one or more exclude specification markers proximate to each of the identified matched elements in the specification to generate an instrumented specification, wherein each exclude specification marker comprises an exclude style;
executing the instrumented specification in the Business Intelligence Environment to generate a second Business Intelligence Artifact Output, wherein the second Business Intelligence Artifact Output comprise one or more output markers associated with at least one of the injected exclude specification markers, and wherein each of the output markers is generated based on one or more visual formatting rules of at least one of the associated injected specification markers; and wherein each of the output markers include one or more visual characteristics rendered in the exclude style;
generating a first set of images which represent at least a portion of the content from the first Business Intelligence Artifact Output;
generating a second set of images which represent at least a portion of the content from the second Business Intelligence Artifact Output, wherein the second set of images include parts visually identified in the exclude style that are associated with the identified matched elements;
comparing at least a portion the first set of images to at least a portion of the second set of images, wherein parts of the first set of images and parts of the second set of images visually identified in the exclude style are not compared; and
determining a set of meaningful differences between the first Business Intelligence Artifact Output and the second Business Intelligence Artifact Output based on the comparison.

14. The method of claim 13 further comprising presenting one or more of the meaningful differences in the set of meaningful differences via a graphical user interface.

15. The method of claim 14 wherein presenting one or more of the meaningful differences comprises presenting at least one of:
a first Enhanced Business Intelligence Artifact Output in which each of the meaningful differences in the determined set of meaningful differences is visually identified in a difference region style,
or a second Enhanced Business Intelligence Artifact Output in which each of the meaningful differences in the determined set of meaningful differences is visually identified in the difference region style;
and wherein the first Enhanced Business Intelligence Artifact Output comprises the first Business Intelligence Artifact Output combined with a first overlay providing a visual identification in the difference region style of each of the meaningful differences in the set of meaningful differences; and wherein the second Enhanced Business Intelligence Artifact Output comprises the second Business Intelligence Artifact Output combined with a second overlay providing a visual identification in the difference region style of each of the meaningful differences in the set of meaningful differences.

16. The method of claim 15 wherein parts of the second Business Intelligence Artifact Output identified in the exclude style are visually identified in the second Enhanced Business Intelligence Artifact Output in the exclude style.

17. The method of claim 15 wherein visually identifying the determined set of meaningful differences comprises bounding via a first overlay one or more regions in at least a portion of the first Business Intelligence Artifact Output in the difference region style, and further comprising identifying one or more meaningful differences in a first region of the first set of images that are within a predetermined number of pixels from a second region including one or more other meaningful differences; and bounding, via the first overlay, a third region in the first Business Intelligence Artifact Output of the first Enhanced Business Intelligence Artifact Output in the difference region style, wherein the third region includes a first region associated with the first region of the first set of images, a second region associated with the second region of the first set of images, and a fourth region associated with a fourth region in the first set of images, wherein the fourth region in the first set of images is disposed at least one of between or proximate the first region of the first set of images and second region of the first set of images, wherein the fourth region has a size less than the predetermined number of pixels.

18. The method of claim 15 wherein in at least one of the first Enhanced Business Intelligence Artifact Output or the second Enhanced Business Intelligence Artifact Output, a visual identification of one or more of the output regions associated with one or more of the expressions in the set of expressions to exclude is less visually apparent to a user than a visual identification of each of the output regions that contains one or more meaningful differences in the set of meaningful differences.

19. The method of claim 13 wherein determining the set of meaningful differences comprises:
   comparing portions of the first set of images to portions of the second set of images; and
   identifying the differences that occur in image regions not bounded by the exclude style.

20. The method of claim 13 further comprising:
   receiving a request for comparison of a second portion of the content from the first Business Intelligence Artifact Output and a second portion of the content from the second Business Intelligence Artifact Output;
   generating an additional first set of images which represent the second portion of the content from the first Business Intelligence Artifact Output;
   generating an additional second set of images which represent the second portion of the content from the second Business Intelligence Artifact Output;
   comparing at least a portion the additional first set of images to at least a portion of the additional second set of images, wherein parts of the additional first set of images and parts of the additional second set of images visually identified in the exclude style are not compared;
   determining an additional set of meaningful differences between the first Business Intelligence Artifact and the second Business Intelligence Artifact based on the comparison; and
   adding the meaningful differences to the additional set of meaningful differences to the set of meaningful differences.

* * * * *